(12) United States Patent
Eguchi et al.

(10) Patent No.: US 10,495,118 B2
(45) Date of Patent: Dec. 3, 2019

(54) HYDRAULIC DRIVE DEVICE AND METHOD FOR CONTROLLING THE SAME

(71) Applicant: Kobe Steel, Ltd., Hyogo (JP)

(72) Inventors: Toru Eguchi, Kobe (JP); Yoshiharu Nishida, Kobe (JP); Naofumi Kanei, Takasago (JP); Hideto Fujiwara, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 197 days.

(21) Appl. No.: 15/738,163

(22) PCT Filed: May 30, 2016

(86) PCT No.: PCT/JP2016/065870
§ 371 (c)(1),
(2) Date: Dec. 20, 2017

(87) PCT Pub. No.: WO2016/208329
PCT Pub. Date: Dec. 29, 2016

(65) Prior Publication Data
US 2018/0202467 A1 Jul. 19, 2018

(30) Foreign Application Priority Data
Jun. 24, 2015 (JP) .................... 2015-126671

(51) Int. Cl.
*F15B 11/024* (2006.01)
*F15B 13/04* (2006.01)
(Continued)

(52) U.S. Cl.
CPC .............. *F15B 11/024* (2013.01); *B29B 7/22* (2013.01); *F15B 11/028* (2013.01);
(Continued)

(58) Field of Classification Search
CPC .. F15B 11/024; F15B 11/028; F15B 13/1401; F15B 21/047; F15B 2011/0243; F15B 2211/8609; B29B 7/22
See application file for complete search history.

(56) References Cited

U.S. PATENT DOCUMENTS

2015/0066313 A1* 3/2015 Hirozawa ............ E02F 9/2217
701/50
2016/0312444 A1* 10/2016 Joo ......................... B66C 13/20

FOREIGN PATENT DOCUMENTS

| CN | 101402230 A | 4/2009 |
| JP | H05-302604 A | 11/1993 |

(Continued)

OTHER PUBLICATIONS

Extended European Search Report issued by the European Patent Office dated Feb. 13, 2019, which corresponds to EP16814100.0-1010 and is related to U.S. Appl. No. 15/738,163.
(Continued)

*Primary Examiner* — Michael Leslie
*Assistant Examiner* — Daniel S Collins
(74) *Attorney, Agent, or Firm* — Studebaker & Brackett PC

(57) ABSTRACT

Provided is a hydraulic drive device, wherein the hydraulic drive device is provided with: a cylinder (101); a rod (103); a piston (102); a hydraulic pump (107); a tank (113); a valve (106) that can be switched between a positive state of connecting the hydraulic pump (107) and a head chamber (101*h*) and connecting a rod chamber (101*r*) and the tank (113), and a negative state of connecting the hydraulic pump (107) and the rod chamber (101*r*) and connecting the head chamber (101*h*) and the tank (113); and a confluence channel (114) at which, when the valve (106) is in the positive state, at least a portion of hydraulic oil going from the rod
(Continued)

chamber (101r) to the tank (113) is merged into hydraulic oil going from the hydraulic pump (107) to the head chamber (101h).

16 Claims, 15 Drawing Sheets

(51) Int. Cl.
*F15B 11/028* (2006.01)
*B29B 7/22* (2006.01)
*F15B 21/08* (2006.01)
*B29B 7/28* (2006.01)
*F15B 19/00* (2006.01)
*B29B 7/74* (2006.01)
*F15B 11/10* (2006.01)

(52) U.S. Cl.
CPC ............ *F15B 13/0401* (2013.01); *B29B 7/28* (2013.01); *B29B 7/7495* (2013.01); *F15B 11/10* (2013.01); *F15B 19/007* (2013.01); *F15B 21/087* (2013.01); *F15B 2013/041* (2013.01); *F15B 2211/3058* (2013.01); *F15B 2211/30505* (2013.01); *F15B 2211/30525* (2013.01); *F15B 2211/3144* (2013.01); *F15B 2211/327* (2013.01); *F15B 2211/351* (2013.01); *F15B 2211/365* (2013.01); *F15B 2211/6309* (2013.01); *F15B 2211/6313* (2013.01); *F15B 2211/6336* (2013.01); *F15B 2211/6346* (2013.01); *F15B 2211/6653* (2013.01); *F15B 2211/6654* (2013.01); *F15B 2211/6656* (2013.01); *F15B 2211/7053* (2013.01); *F15B 2211/7054* (2013.01); *F15B 2211/76* (2013.01); *F15B 2211/8609* (2013.01)

(56) References Cited

FOREIGN PATENT DOCUMENTS

| | | |
|---|---|---|
| JP | 2001-214903 A | 8/2001 |
| JP | 2010-190261 A | 9/2010 |

OTHER PUBLICATIONS

International Search Report issued in PCT/JP2016/065870; dated Aug. 16, 2016.

\* cited by examiner

F I G. 10
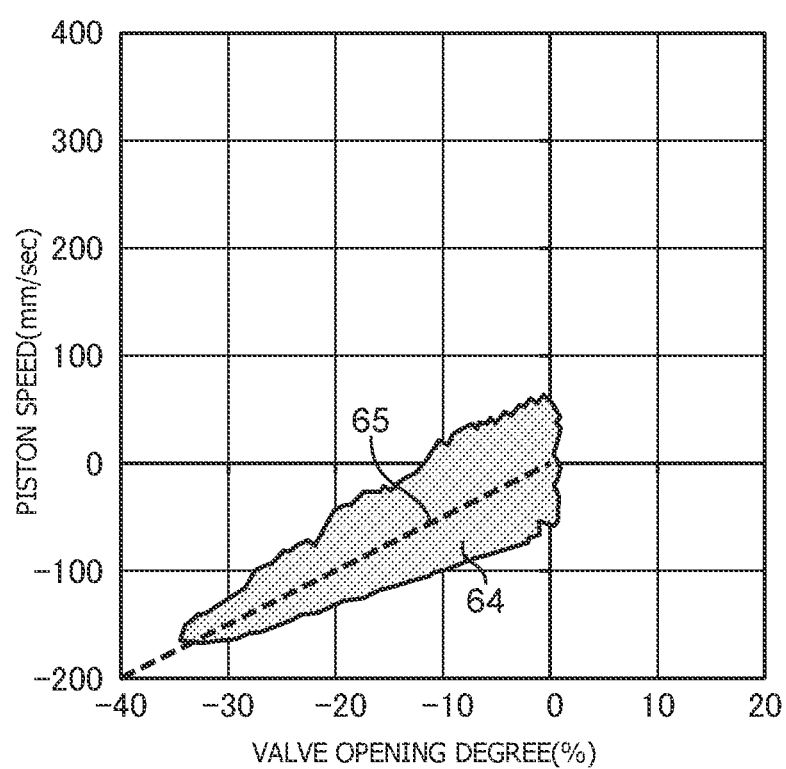

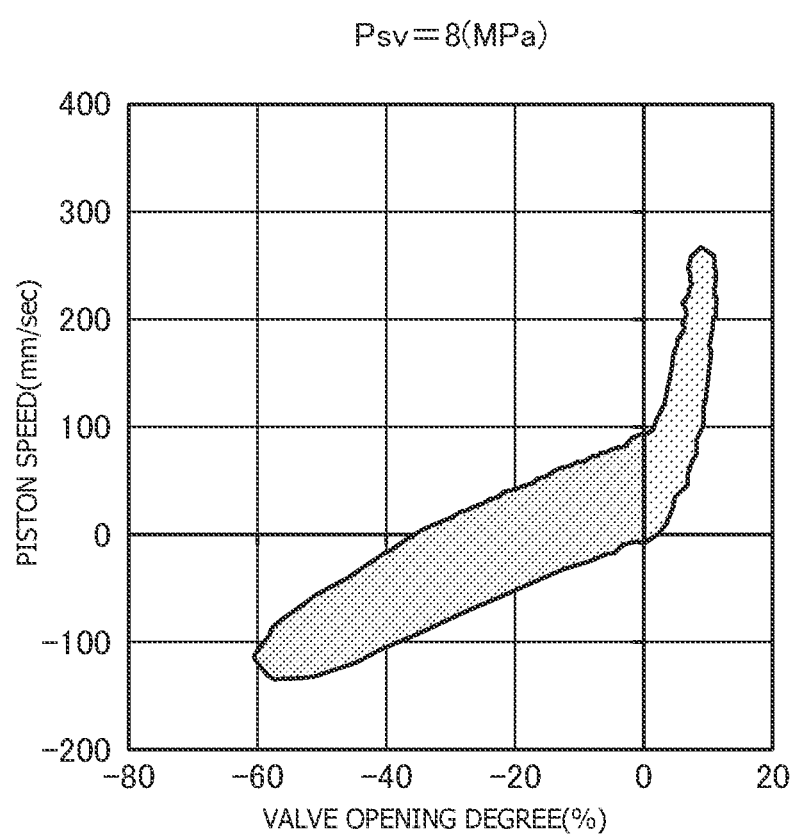
F I G. 14

HYDRAULIC DRIVE DEVICE AND METHOD FOR CONTROLLING THE SAME

TECHNICAL FIELD

The present invention relates to a hydraulic drive device and a method for controlling the same.

BACKGROUND ART

Hitherto, as a drive device commonly used in an industrial machine, and the like, a hydraulic drive device has been known. The hydraulic drive device includes a cylinder, a piston, a rod, a hydraulic pump, a valve, and a tank. In this device, a hydraulic oil discharged from the hydraulic pump is supplied to a head chamber or a rod chamber of the cylinder by the switching of the valve. A pressure of the hydraulic oil at that time allows the piston and the rod to move in a reciprocating manner.

Such a hydraulic drive device is used, for example, for a kneader which kneads rubber for a tire. Specifically, a drive portion (ram) which kneads rubber is connected to a top end of the rod, and the ram kneads rubber in accordance with a reciprocating movement of the piston and the rod.

Incidentally, a kneading quality in a kneader for a tire rubber depends on whether a ram is pushed onto rubber as a target constantly at a desired pressure and speed (uniformization of an agitation effect on rubber), and to achieve the same, in a hydraulic cylinder system, an extremely high pressure control performance is required.

Incidentally, in such a hydraulic drive device, depending on an operation situation of the ram, a volume expansion of the head chamber of the cylinder fails to be followed by a flow rate of the hydraulic oil supplied to the head chamber from the hydraulic pump, which may generate a negative pressure in the head chamber. In such a case, cavitation occurs in the head chamber, and hydraulic equipment and a hydraulic circuit may suffer from various troubles.

As a technique for preventing such a problem (negative pressure generated in the head chamber), a hydraulic drive device as described in Patent Document 1 has been known. The hydraulic drive device described in Patent Document 1 includes two respective hydraulic pumps which can supply a hydraulic oil independently of each other to a head chamber and a rod chamber of a cylinder. These hydraulic pumps are each controlled in an independent manner, thereby preventing a head pressure from becoming a negative pressure regardless of an operation situation of a load connected to a rod.

In the hydraulic drive device as described in Patent Document 1, the two pumps are each required to be controlled in an independent manner so that the control over the whole device becomes complicated.

CITATION LIST

Patent Document

Patent Document 1: JP 2001-214903 A

SUMMARY OF THE INVENTION

An object of the present invention is to provide a hydraulic drive device having a simple structure which can prevent a negative pressure from being generated in a head chamber, and a control method to follow changes in a control characteristic caused due to the structure.

A hydraulic drive device according to one aspect of the present invention includes a cylinder; a rod expandable and contractible with respect to the cylinder; a piston which is connected to the rod and divides the cylinder internally into a rod chamber and a head chamber; a hydraulic pump which delivers a hydraulic oil to the cylinder; a tank which stores the hydraulic oil flown from the cylinder; a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other; and a merging flow passage which allows at least a portion of the hydraulic oil from the rod chamber toward the tank to be merged into the hydraulic oil from the hydraulic pump toward the head chamber when the valve is in the positive state.

A method for controlling a hydraulic drive device according to one aspect of the present invention, in which the hydraulic drive device includes: a cylinder; a rod expandable and contractible with respect to the cylinder; a piston which is connected to the rod and divides the cylinder internally into a rod chamber and a head chamber; a hydraulic pump which delivers a hydraulic oil to the cylinder; a tank which stores the hydraulic oil flown from the cylinder; a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other; and a merging flow passage which allows at least a portion of the hydraulic oil from the rod chamber toward the tank to be merged into the hydraulic oil from the hydraulic pump toward the head chamber when the valve is in the positive state, includes: a determination step of determining whether or not an inflow condition which indicates that the hydraulic oil flows into the head chamber through the merging flow passage is satisfied; and an opening degree command value calculation step of calculating the opening degree command value on the basis of a predetermined relational expression and transmitting the opening degree command value to the valve when it is determined in the determination step that the inflow condition is satisfied, and calculating the opening degree command value on the basis of a relational expression different from the predetermined relational expression and transmitting the opening degree command value to the valve when it is not determined in the determination step that the inflow condition is satisfied.

BRIEF DESCRIPTION OF DRAWINGS

FIG. 10 is a graph illustrating a relationship between the opening degree command value and the piston speed when the opening degree command value is a negative value.

FIG. 14 is a graph illustrating a relationship between the opening degree command value and the piston speed when the target cylinder pressure is 8 MPa.

DESCRIPTION OF EMBODIMENTS

Hereinafter, preferred embodiments of the present invention will be described with reference to the drawings.

[First Embodiment]

A hydraulic drive device according to a first embodiment of the present invention will be described with reference to FIGS. 1 to 6.

Figure 1:
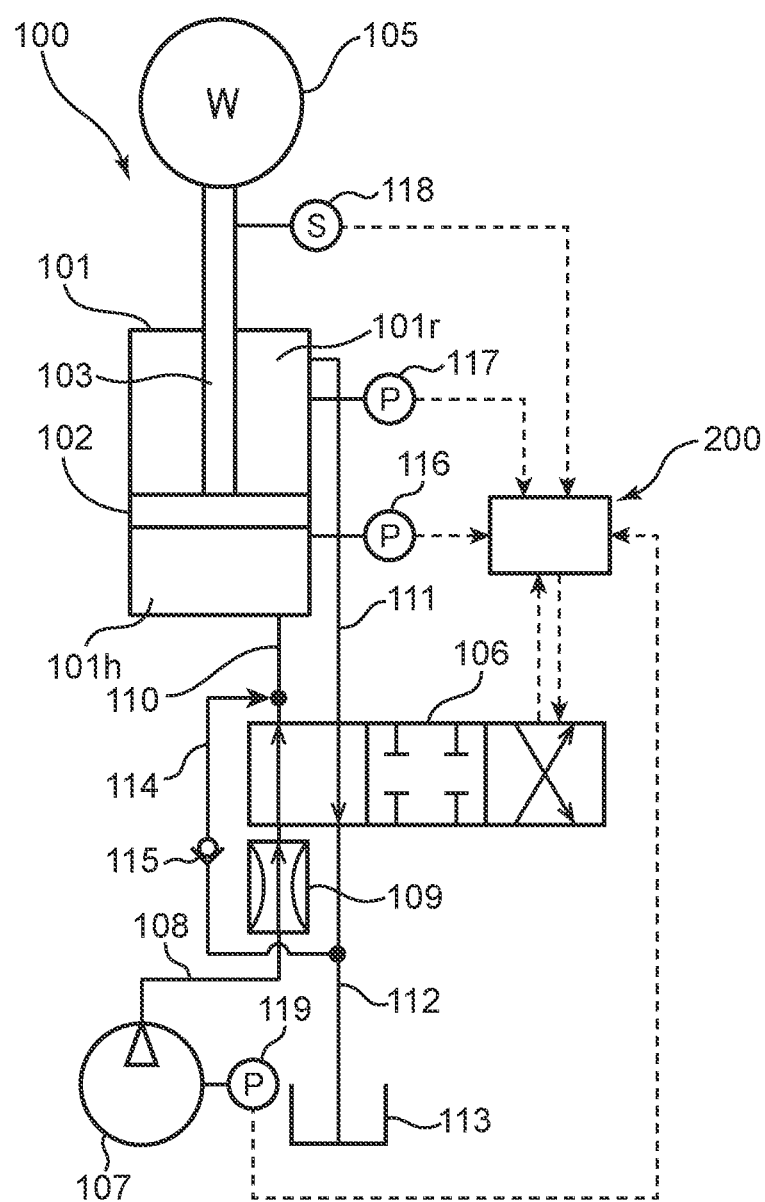
FIG. 1 is a diagram schematically illustrating a hydraulic drive device according to a first embodiment of the present invention.
Figure 2:
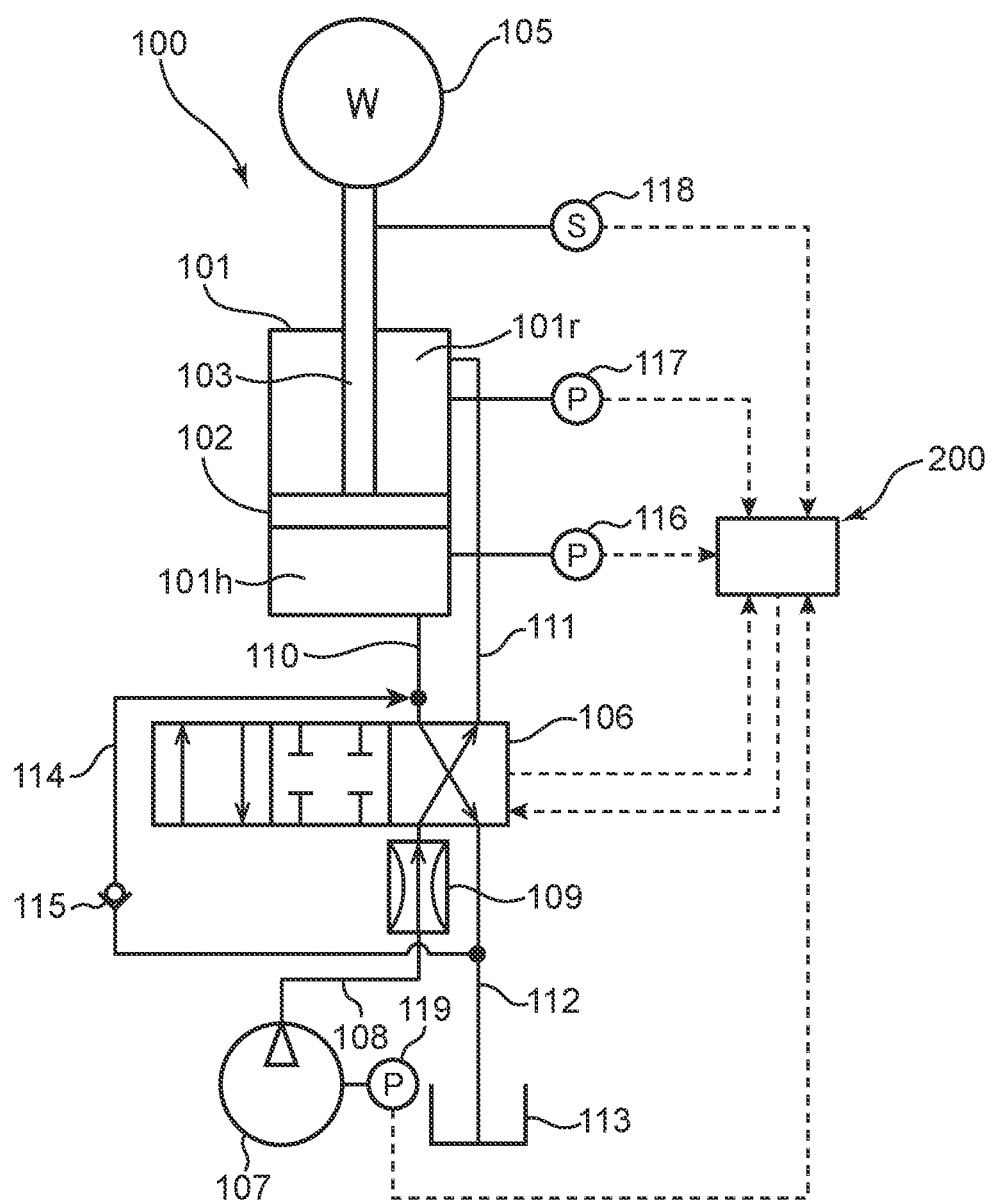
FIG. 2 is a diagram schematically illustrating the hydraulic drive device according to the first embodiment of the present invention.

As illustrated in FIGS. 1 and 2, the present hydraulic drive device includes a hydraulic unit 100 and a control unit 200. The hydraulic unit 100 includes a cylinder 101, a rod 103, a piston 102, a hydraulic pump 107, a tank 113, a valve 106, and a merging flow passage 114.

The cylinder 101 is a pressure vessel having a cylindrical shape. The cylinder 101 is disposed in such a posture that a center axis of the cylinder 101 is vertical. This cylinder 101 is internally divided by the piston 102 into a rod chamber 101r and a head chamber 101h.

The rod 103 is held by the cylinder 101 so as to be expandable and contractible (in a vertical direction) with respect to the cylinder 101 along an axial direction of the cylinder 101. A base end of the rod 103 is positioned inside the cylinder 101, and a top end of the rod 103 is positioned outside the cylinder 101. To the top end of the rod 103, a load 105 is connected. In the present embodiment, to the top end of the rod 103, a ram for kneading rubber is connected as the load 105.

The piston 102 is connected to the base end of the rod 103. The piston 102 is formed into a disk shape. The piston 102 divides the cylinder 101 internally into the rod chamber 101r in which the rod 103 is positioned and the head chamber 101h.

The hydraulic pump 107 delivers a hydraulic oil into the cylinder 101 (the rod chamber 101r and the head chamber 101h).

The tank 113 stores the hydraulic oil flown from the cylinder 101.

The valve 106 performs switching between a positive state (state shown in FIG. 1) in which the hydraulic pump 107 and the head chamber 101h are connected to each other and the rod chamber 101r and the tank 113 are connected to each other and a negative state (a state shown in FIG. 2) in which the hydraulic pump 107 and the rod chamber 101r are connected to each other and the head chamber 101h and the tank 113 are connected to each other. Specifically, the valve 106, in the positive state, connects a pump connection flow passage 108 and a head chamber connection flow passage 110 to each other and connects a rod chamber connection flow passage 111 and a tank connection flow passage 112 to each other. On the other hand, the valve 106, in the negative state, connects the pump connection flow passage 108 and the rod chamber connection flow passage 111 to each other and connects the head chamber connection flow passage 110 and the tank connection flow passage 112 to each other.

When the valve 106 is in the positive state, the hydraulic oil as discharged from the hydraulic pump 107 flows through the pump connection flow passage 108 and the head chamber connection flow passage 110 into the head chamber 101h, and accordingly a pressure of this hydraulic oil allows the piston 102 and the rod 103 to move up. At this time, the hydraulic oil in the rod chamber 101r flows through the rod chamber connection flow passage 111 and the tank connection flow passage 112 into the tank 113. On the contrary, when the valve 106 is in the negative state, the hydraulic oil as discharged from the hydraulic pump 107 flows through the pump connection flow passage 108 and the rod chamber connection flow passage 111 into the rod chamber 101r, and accordingly a pressure of this hydraulic oil allows the piston 102 and the rod 103 to move down. At this time, the hydraulic oil in the head chamber 101h flows through the head chamber connection flow passage 110 and the tank connection flow passage 112 into the tank 113. In the present embodiment, a reciprocating movement of the piston 102 and the rod 103 in the vertical direction as described above allows the ram to knead rubber. Note that the pump connection flow passage 108 is provided with an adjustment valve 109 for rectification.

The merging flow passage 114 allows at least a portion of the hydraulic oil from the rod chamber 101r toward the tank 113 to be merged into the hydraulic oil from the hydraulic pump 107 toward the head chamber 101h. Specifically, an upstream side end portion of the merging flow passage 114 is connected to the tank connection flow passage 112, and a downstream side end portion of the merging flow passage 114 is connected to the head chamber connection flow passage 110. The merging flow passage 114 is provided with a check valve 115.

Figure 3:
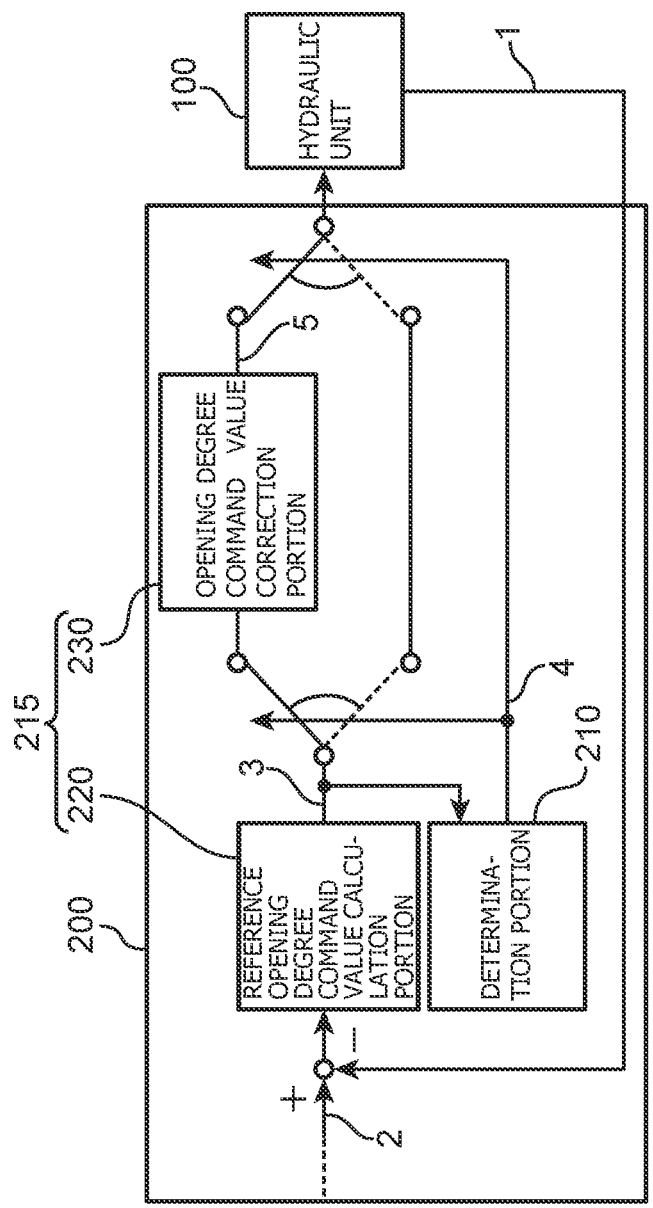
FIG. 3 is a block diagram of a control unit of the hydraulic drive device as illustrated in FIG. 1.
Figure 6:
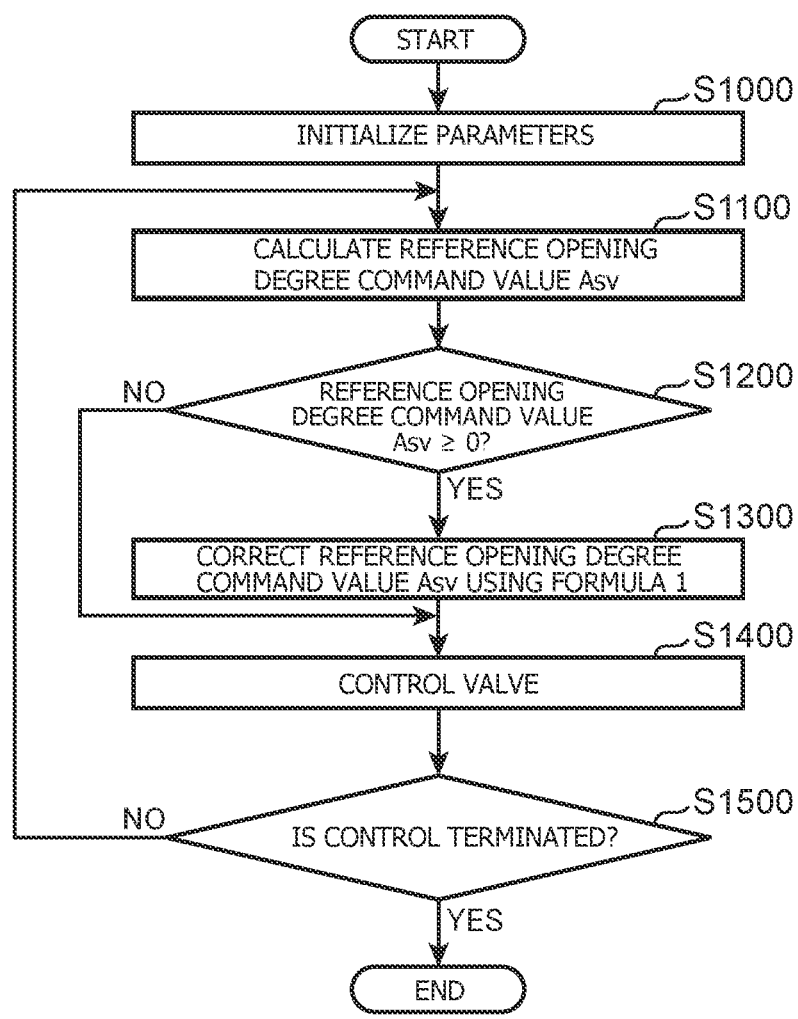
FIG. 6 is a flowchart of the control unit as illustrated in FIG. 3.

The control unit 200 controls an opening degree of the valve 106. Specifically, the control unit 200 calculates an opening degree command value for determining an opening degree of the valve 106 and transmits this opening degree command value to the valve 106. The control unit 200 is constituted by a computer, such as a personal computer and a programmable logic controller, provided to be annexed to the hydraulic unit 100, and in the interior of this computer, processes a signal in accordance with a flowchart (a program) as illustrated in FIG. 6. As illustrated in FIG. 3, the control unit 200 includes a determination portion 210 and an opening degree command value calculation portion 215.

The determination portion 210 determines whether or not an inflow condition which indicates that the hydraulic oil flows into the head chamber 101h through the merging flow passage 114 is satisfied. In the present embodiment, the determination portion 210 determines that the inflow condition is satisfied when a reference opening degree command value $A_{SV}$ which is the opening degree command value of the valve 106 when a target cylinder pressure $P_{SV}$ is obtained is a positive value (a value at which the valve 106 is in the positive state). The target cylinder pressure $P_{SV}$ is a target and a cylinder pressure $P_{PV}$ calculated on the basis of a head pressure $P_{hPV}$ (a pressure of the hydraulic oil which is applied to the head chamber 101h) and a rod pressure $P_{rPV}$ (a pressure of the hydraulic oil which is applied to the rod chamber 101r). Note that a cylinder pressure is the rod pressure $P_{rPV}$ minus the head pressure $P_{hPV}$ multiplied by a ratio of a pressure receiving area on the side of a rod chamber 101r to a pressure receiving area of the head chamber 101h of the piston 102. Moreover, the head pressure $P_{hPV}$ is detected by a pressure sensor 116 which can detect a pressure of the head chamber 101h and the rod pressure $P_{rPV}$ is detected by a pressure sensor 117 which can detect a pressure of the rod chamber 101r.

Herein, a reason for employing the reference opening degree command value $A_{SV}$ as an index for determining whether or not the inflow condition is satisfied is as follows. In short, when the reference opening degree command value $A_{SV}$ is a positive value, the valve is in the positive state (in a phase in which a volume of the head chamber 101h increases) and thus it can be considered that a negative pressure is likely to be generated in the head chamber 101h, in other words, the hydraulic oil is likely to flow into the head chamber 101h through the merging flow passage 114. Thus, it is possible to determine that the inflow condition is satisfied when the reference opening degree command value $A_{SV}$ is a positive value.

The opening degree command value calculation portion 215 calculates the opening degree command value on the basis of a predetermined relational expression and transmits this opening degree command value to the valve 106 when the determination portion 210 determines that the inflow condition is satisfied, and calculates the opening degree command value on the basis of a relational expression different from the predetermined relational expression and transmits this opening degree command value to the valve 106 when the determination portion 210 determines that the inflow condition is not satisfied. In the present embodiment, the opening degree command value calculation portion 215 transmits a value less than the reference opening degree command value $A_{SV}$ as the opening degree command value to the valve 106 when the determination portion 210 determines that the inflow condition is satisfied, and transmits the reference opening degree command value $A_{SV}$ to the valve 106 when the determination portion 210 determines that the inflow condition is not satisfied. A reason therefor will be later described. The opening degree command value calculation portion 215 includes a reference opening degree command value calculation portion 220 and an opening degree command value correction portion 230.

Figure 4:
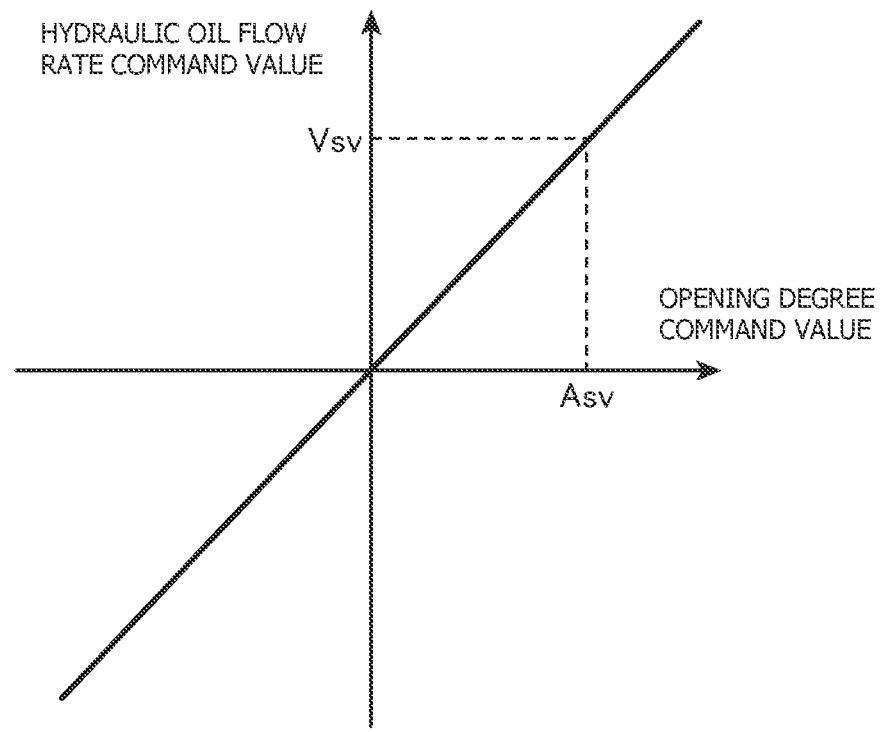
FIG. 4 is a graph illustrating a relationship between an opening degree command value and a flow rate of a hydraulic oil.

The reference opening degree command value calculation portion 220 calculates the reference opening degree command value $A_{SV}$ (the opening degree command value of the valve 106 when the target cylinder pressure $P_{SV}$ is obtained). Specifically, the reference opening degree command value calculation portion 220 calculates a flow rate command value $V_{SV}$ which is a flow rate of the hydraulic oil that is required for obtaining the target cylinder pressure $P_{SV}$ on the basis of the target cylinder pressure $P_{SV}$ and the cylinder pressure $P_{PV}$ (measured values) using a feedback control law, such as a PID controller, and calculates the reference opening degree command value $A_{SV}$ on the basis of a relationship between the flow rate command value $V_{SV}$ and the reference opening degree command value $A_{SV}$ (see FIG. 4). Note that the relationship as illustrated in FIG. 4 is determined in advance under no load and under a condition in which the hydraulic oil does not flow into the head chamber 101h through the merging flow passage 114.

The opening degree command value correction portion 230 corrects the reference opening degree command value $A_{SV}$ to a value less than this reference opening degree command value $A_{SV}$ and transmits this value as the opening command value to the valve 106. Specifically, the opening degree command value correction portion 230 transmits to the valve 106 the reference opening degree command value $A_{SV}$ multiplied by an inclination ratio $a_{off}/a_{on}$ of a negative side inclination $a_{off}$ to a positive side inclination $a_{on}$ as an opening degree command value $A^*_{SV}$ as represented by the below formula (1).

[Mathematical Formula 1]

$$A^*_{SV} = A_{SV} \cdot \frac{a_{off}}{a_{on}} \qquad (1)$$

Herein, the negative side inclination $a_{off}$ indicates an inclination represented by a ratio of an increment in a piston speed (a displacement speed of the piston 102) to an increment in the opening degree command value when this opening degree command value is a negative value. Moreover, the positive side inclination $a_{on}$ indicates an inclination represented by a ratio of an increment in the piston speed to an increment in the opening degree command value when this opening degree command value is a positive value.

Figure 5:
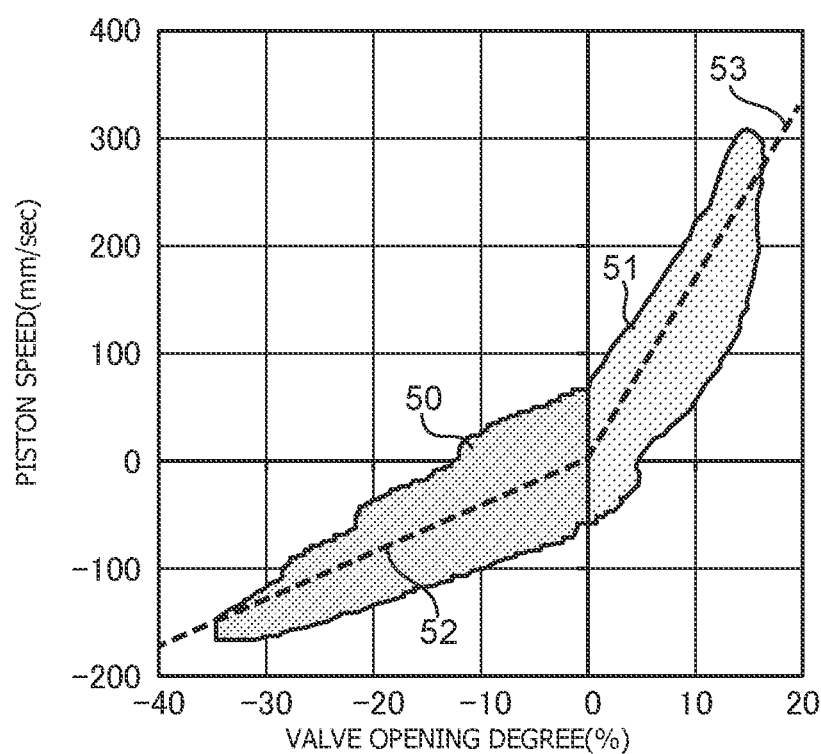
FIG. 5 is a graph illustrating a relationship between the opening degree command value and a piston speed.

FIG. 5 illustrates a scatter plot of operation data with respect to a relationship between the opening degree command value and the piston speed. In FIG. 5, the horizontal axis indicates a measured value of the opening degree command value and the vertical axis indicates the piston speed. In FIG. 5, a region at a right side of the horizontal axis with respect to the origin is a region when the valve 106 is in the positive state and the determination portion 210 determines that the inflow condition is satisfied. On the other hand, in FIG. 5, a region at a left side of the horizontal axis with respect to the origin is a region when the valve 106 is in the negative state and the determination portion 210 determines that the inflow condition is not satisfied. A straight line 52 indicated in FIG. 5 is a linear approximate straight line approximated in such a manner as to pass the origin on the basis of a plot 50 of measured value data when the valve 106 is in the negative state. Similarly, a straight line 53 indicated in FIG. 5 is a linear approximate straight line approximated in such a manner as to pass the origin on the basis of a plot 51 of measured value data when the valve 106 is in the positive state. In other words, an inclination of the straight line 52 corresponds to the negative side inclination $a_{off}$ and an inclination of the straight line 53 corresponds to the positive side inclination $a_{on}$. Note that each of the linear approximate straight lines 52, 53 may be calculated by a known linear approximation method, such as a least squares method.

From FIG. 5, it is apparent that the positive side inclination $a_{on}$ is greater than the negative side inclination $a_{off}$. Thus, the opening degree command value calculation portion 215 transmits to the valve 106 a value less than the reference opening degree command value $A_{SV}$, i.e., the reference opening degree command value $A_{SV}$ multiplied by the inclination ratio $a_{off}/a_{on}$ as the opening degree command value $A*_{SV}$ as represented by the above formula (1) when the determination portion 210 determines that the inflow condition is satisfied. Specifically, as illustrated in FIG. 3, when the reference opening degree command value $A_{SV}$ which is an output signal 3 from the reference opening degree command value calculation portion 220 is inputted to the determination portion 210, and a determination result signal 4 outputted from the determination portion 210 is a signal indicating that the reference opening degree command value $A_{SV}$ is a positive value, switching to a circuit in which the reference opening degree command value $A_{SV}$ outputted from the reference opening degree command value calculation portion 220 is inputted to the opening degree command value correction portion 230 is performed. On the other hand, when the determination result signal 4 outputted from the determination portion 210 is a signal indicating that the reference opening degree command value $A_{SV}$ is a negative value, switching to a circuit in which the reference opening degree command value $A_{SV}$ outputted from the reference opening degree command value calculation portion 220 is inputted as it is to the valve 106 of the hydraulic unit 100 is performed.

The control process of the control unit 200 as described above will be described with reference to a flowchart as illustrated in FIG. 6.

When the present hydraulic drive device is driven (when a supply of the hydraulic oil from the hydraulic pump 107 is started), first, parameters calculated in the past are initialized (step S1000). At this time, a measured value 1 of the hydraulic unit 100 (the cylinder pressure $P_{PV}$ inclusive) is inputted to the reference opening degree command value calculation portion 220 of the control unit 200. Then, the reference opening degree command value calculation portion 220 calculates the reference opening degree command value $A_{SV}$ on the basis of a signal 2 including the target cylinder pressure $P_{sv}$ and the measured value 1 (step S1100). This reference opening degree command value $A_{SV}$ is inputted to the determination portion 210.

Subsequently, the determination portion 210 determines whether or not the reference opening degree command value $A_{SV}$ is a positive value (step S1200). As a result, when the reference opening degree command value $A_{SV}$ is a positive value (YES at step S1200), the opening degree command value correction portion 230 of the opening degree command value calculation portion 215 calculates the opening degree command value $A*_{SV}$ on the basis of the above formula (1) (step S1300) and transmits this value (a signal 5) to the valve 106. On the other hand, when the reference opening degree command value $A_{SV}$ is a negative value (NO at step S1200), the opening degree command value calculation portion 215 transmits the reference opening degree command value $A_{SV}$ (the signal 3) to the valve 106. Then, on the basis of this value, the valve 106 is controlled (step S1400).

Next, the control unit 200 determines whether or not a predetermined termination condition is satisfied (step S1500). As a result, when the termination condition is satisfied (YES at step S1500), the control is terminated, and when the termination condition is not satisfied (NO at step S1500), a return to step S1100 is performed.

When the hydraulic drive device as described above is driven, the valve 106 performs switching between the positive state and the negative state, whereby the piston 102 and the rod 103 repeats a reciprocating movement in the vertical direction. Thereby, the load 105 (the ram) kneads rubber.

Herein, although an action of the repulsive force, the inertial force, and the like applied from a load 105 side occasionally causes the head pressure $P_{hPV}$ to be decreased when the valve 106 is in the positive state, in the present embodiment, in such a case, at least a portion of the hydraulic oil from the rod chamber 101r toward the tank 113 flows into the head chamber 101h through the merging flow passage 114. Accordingly, the head pressure $P_{hPV}$ is prevented from becoming a negative pressure during an operation of the device. In other words, in the present embodiment, such a simple structure as to be provided with the merging flow passage 114 can prevent cavitation from occurring in the head chamber 101h.

Moreover, in the above embodiment, the opening degree command value calculation portion 215 calculates the opening degree command value on the basis of a predetermined relational expression and transmits this opening degree command value to the valve 106 when the determination portion 210 determines that the inflow condition is satisfied, and calculates the opening degree command value on the basis of a relational expression different from the predetermined relational expression and transmits this opening degree command value to the valve 106 when the determination portion 210 does not determine that the inflow condition is satisfied.

Accordingly, destabilization of a reciprocating movement of the piston 102 and the rod 103 (a vertical movement in the present embodiment) is prevented. Specifically, the opening degree command value different depending on whether the inflow condition is determined to be satisfied or not determined to be satisfied is transmitted to the valve 106, so that as compared with a case in which the same opening degree command value is transmitted to the valve 106 regardless of whether or not the inflow condition is satisfied, a reciprocating movement of the piston 102 and the rod 103 is stabilized.

Further, in the above embodiment, the opening degree command value calculation portion 215 transmits a value less than the reference opening degree command value $A_{SV}$ as the opening degree command value to the valve 106 when the determination portion 210 determines that the inflow condition is satisfied, and transmits the reference opening degree command value $A_{SV}$ to the valve 106 when the determination portion 210 determines that the inflow condition is not satisfied.

In this aspect, when the reference opening degree command value $A_{SV}$ is a positive value, in other words, when it is feared that the hydraulic oil flows into the head chamber 101h through the merging flow passage 114, a value less than the reference opening degree command value $A_{SV}$ at which the target cylinder pressure $P_{sv}$ is obtained is transmitted as the opening degree command value to the valve 106 (an opening degree of the valve 106 is set to an opening degree less than an opening degree at which the target cylinder pressure $P_{sv}$ is obtained). Accordingly, disturbance of the relationship between the opening degree command value and a flow rate of the oil passing the valve 106 (a flow rate of the oil flowing into the head chamber 101h) is prevented, whereby destabilization of a reciprocating movement of the rod 103 is prevented.

Specifically, the opening degree command value calculation portion 215 transmits to the valve 106 the reference opening degree command value $A_{SV}$ multiplied by the inclination ratio $a_{off}/a_{on}$ as the opening degree command value $A^*_{SV}$ when the determination portion 210 determines that the inflow condition is satisfied.

Thus, the relationship between the opening degree command value and a flow rate of the hydraulic oil flowing into the head chamber 101h when the reference opening degree command value $A_{SV}$ is a positive value is substantially identical to that when the reference opening degree command value $A_{SV}$ is a negative value, so that destabilization of a reciprocating movement of the rod 103 is further prevented.

[Second Embodiment]

Next, the hydraulic drive device according to a second embodiment of the present invention will be described with reference to FIGS. 7 to 11. Note that in the second embodiment, description will be made only on parts different from those in the first embodiment, and description of a configuration, action, and effects identical to those in the first embodiment is omitted.

In the present embodiment, a logic of determination by the determination portion 210 and a manner to correct the reference opening degree command value $A_{SV}$ by the opening degree command value calculation portion 215 are mainly different. Specifically, the opening degree command value calculation portion 215 transmits to the valve 106 the reference opening degree command value $A_{SV}$ multiplied by a first inclination ratio $a_{base}/a_1$ as the opening degree command value when the determination portion 210 determines that the inflow condition is satisfied and the head pressure $P_{hPV}$ is greater than or equal to a threshold value. On the other hand, the opening degree command value calculation portion 215 transmits to the valve 106 the reference opening degree command value multiplied by a second inclination ratio $a_{base}/a_2$ as the opening degree command value when the determination portion 210 determines that the inflow condition is satisfied and the head pressure $P_{hPV}$ is less than the threshold value. Then, the opening degree command value calculation portion 215 transmits the reference opening degree command value $A_{SV}$ to the valve 106 when the determination portion 210 determines that the inflow condition is not satisfied.

Herein, the threshold value is set to a value greater than the head pressure when the hydraulic oil flows into the head chamber 101h through the merging flow passage 114.

The first inclination ratio $a_{base}/a_1$ indicates a ratio of a negative side inclination $a_{base}$ to a first positive side inclination $a_1$. The negative side inclination $a_{base}$ is an inclination represented by a ratio of an increment in a displacement speed of the rod 103 to an increment in the opening degree command value when the opening degree command value is a negative value. The first positive side inclination $a_1$ is an inclination represented by a ratio of an increment in a displacement speed of the rod 103 to an increment in the opening degree command value when the opening degree command value is a positive value and the head pressure $P_{hPV}$ is greater than or equal to the threshold value, and is an inclination greater than the negative side inclination $a_{base}$.

The second inclination ratio $a_{base}/a_2$ indicates a ratio of the negative side inclination $a_{base}$ to a second positive side inclination $a_2$. The second positive side inclination $a_2$ is an inclination represented by a ratio of an increment in a displacement speed of the rod 103 to an increment in the opening degree command value when the opening degree command value is a positive value and the head pressure $P_{hPV}$ is less than the threshold value, and is an inclination greater than the negative side inclination $a_{base}$.

Figure 7:
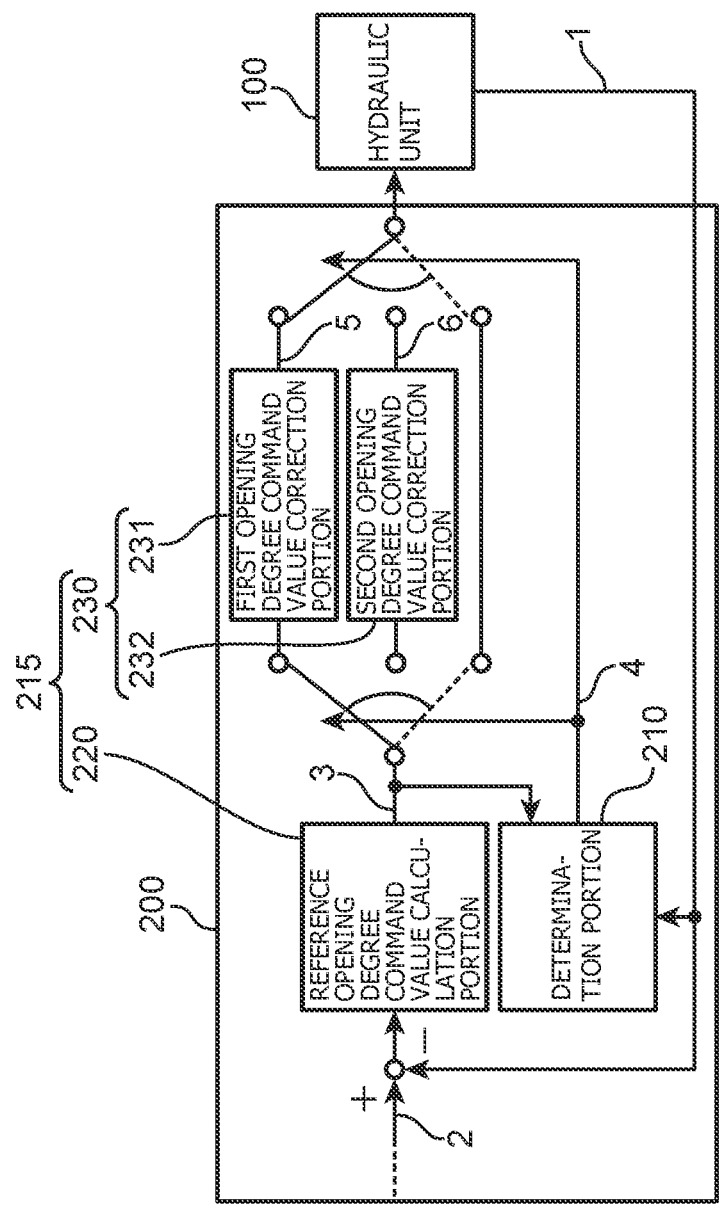
FIG. 7 is a block diagram of the control unit of the hydraulic drive device according to a second embodiment of the present invention.

In the present embodiment, as illustrated in FIG. 7, to the determination portion 210, the head pressure $P_{hPV}$ included in the measured value 1 of the hydraulic unit 100 and the reference opening degree command value $A_{SV}$ which is an output signal from the reference opening degree command value calculation portion 220 are inputted. The determination portion 210 determines whether or not the reference opening degree command value $A_{SV}$ is a positive value and whether or not the head pressure $P_{hPV}$ is greater than or equal to the threshold value. Specifically, the determination portion 210 outputs a first signal when the reference opening degree command value $A_{SV}$ is a positive value and the head pressure $P_{hPV}$ is greater than or equal to the threshold value, outputs a second signal when the reference opening degree command value $A_{SV}$ is a positive value and the head pressure $P_{hPV}$ is less than the threshold value, and outputs a third signal when the reference opening degree command value $A_{SV}$ is a negative value.

The opening degree command value correction portion 230 includes a first opening degree command value correction portion 231 and a second opening degree command value correction portion 232.

The first opening degree command value correction portion 231 corrects the reference opening degree command value $A_{SV}$ to a value less than this reference opening degree command value $A_{SV}$ and transmits this value (a signal 5) as the opening command value to the valve 106. Specifically, the first opening degree command value correction portion 231 transmits to the valve 106 the reference opening degree command value $A_{SV}$ multiplied by the first inclination ratio $a_{base}/a_1$ of the negative side inclination $a_{base}$ to the first positive side inclination $a_1$ as the opening degree command value $A^*_{SV}$ as represented by the below formula (2).

[Mathematical Formula 2]

$$A^*_{SV} = A_{SV} \cdot \frac{a_{base}}{a_1} \quad (2)$$

The second opening degree command value correction portion 232 corrects the reference opening degree command value $A_{SV}$ to a value less than this reference opening degree command value $A_{SV}$ and transmits this value (a signal 6) as the opening command value to the valve 106. Specifically, the second opening degree command value correction portion 232 transmits to the valve 106 the reference opening degree command value $A_{SV}$ multiplied by the second inclination ratio $a_{base}/a_2$ of the negative side inclination $a_{base}$ to the second positive side inclination $a_2$ as the opening degree command value $A^*_{SV}$ as represented by the below formula (3).

[Mathematical Formula 3]

$$A^*_{SV} = A_{SV} \cdot \frac{a_{base}}{a_2} \quad (3)$$

Figure 8:
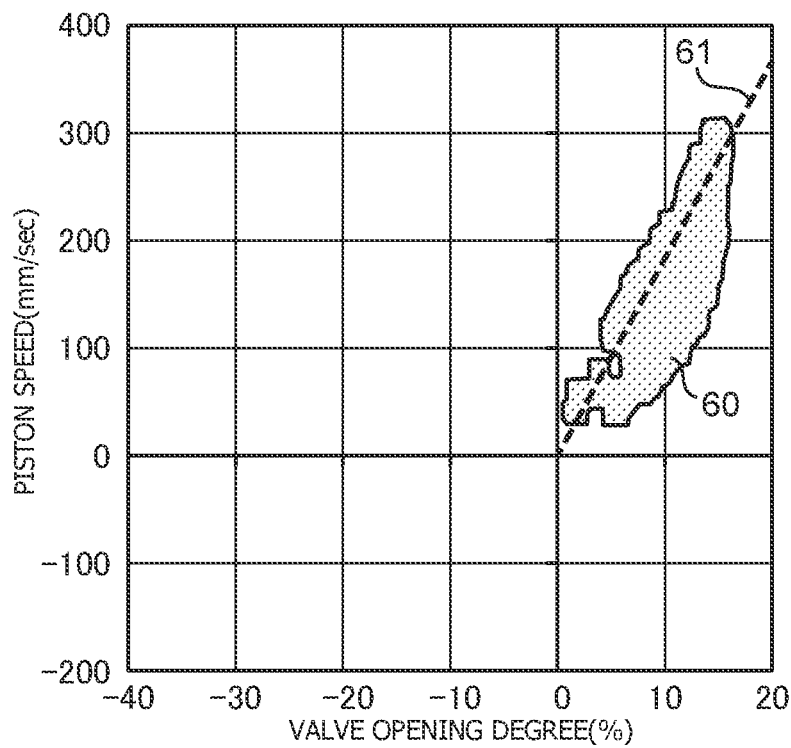
FIG. 8 is a graph illustrating a relationship between the opening degree command value and the piston speed when the opening degree command value is a positive value and a head pressure is greater than or equal to a threshold value.

FIG. 8 illustrates a scatter plot of operation data when the valve 106 is in the positive state (the opening degree command value is a positive value) and the head pressure $P_{hPV}$ is greater than or equal to the threshold value. A straight line 61 indicated in FIG. 8 is a linear approximate straight line approximated in such a manner as to pass the origin on the basis of a plot 60 of measured value data. In other words, an inclination of this straight line 61 corresponds to the first positive side inclination at.

Figure 9:
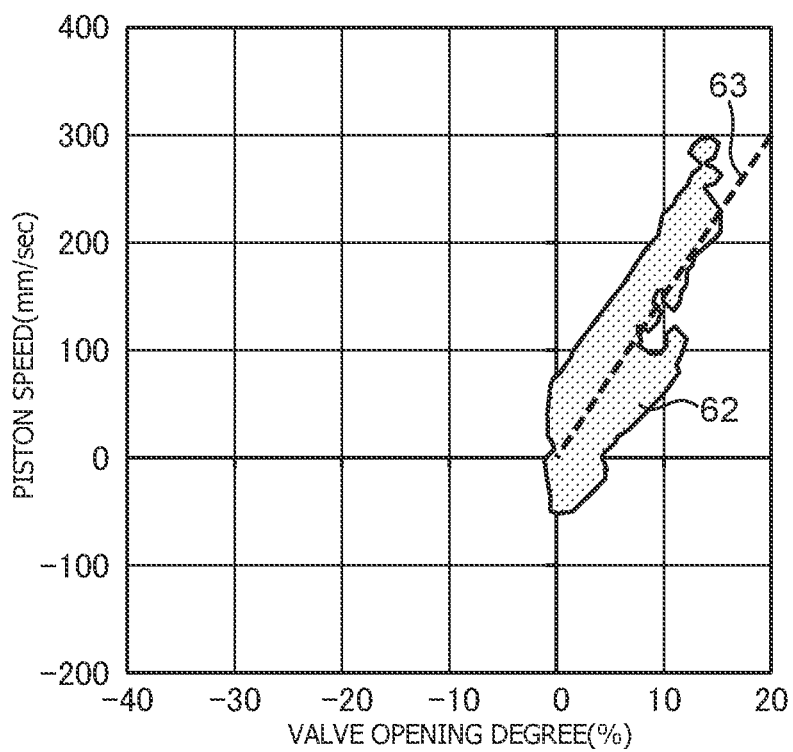
FIG. 9 is a graph illustrating a relationship between the opening degree command value and the piston speed when the opening degree command value is a positive value and the head pressure is less than the threshold value.

FIG. 9 illustrates a scatter plot of operation data when the valve 106 is in the positive state (the opening degree command value is a positive value) and the head pressure $P_{hPV}$ is less than the threshold value. A straight line 63 indicated in FIG. 9 is a linear approximate straight line approximated in such a manner as to pass the origin on the basis of a plot 62 of measured value data. In other words, an inclination of this straight line 63 corresponds to the second positive side inclination $a_2$.

FIG. 10 illustrates a scatter plot of operation data when the valve 106 is in the negative state (when the opening degree command value is a negative value). A straight line 65 indicated in FIG. 10 is a linear approximate straight line approximated in such a manner as to pass the origin on the basis of a plot 64 of measured value data. In other words, an inclination of this straight line 65 corresponds to the negative side inclination $a_{base}$. Note that the negative side inclination $a_{base}$ is identical to the negative side inclination $a_{off}$ in the first embodiment.

From FIGS. 8 to 10, it is apparent that the first positive side inclination $a_1$ and the second positive side inclination $a_2$ are greater than the negative side inclination $a_{off}$, and the second positive side inclination $a_2$ is larger than the first positive side inclination $a_1$. Thus, the opening degree command value calculation portion 215 transmits to the valve 106 the reference opening degree command value $A_{SV}$ multiplied by the first inclination ratio $a_{base}/a_1$ as the opening degree command value $A^*_{SV}$ as represented by the above formula (2) when the determination portion 210 determines that the inflow condition is satisfied and the head pressure $P_{hPV}$ is greater than or equal to the threshold value. In other words, the first signal outputted by the determination portion 210 is used as a signal for switching to a circuit in which the opening degree command value $A_{SV}$ which is the output signal 3 from the reference opening degree command value calculation portion 220 is inputted to the first opening degree command value correction portion 231. Moreover, the opening degree command value calculation portion 215 transmits to the valve 106 the reference opening degree command value $A_{SV}$ multiplied by the second inclination ratio $a_{base}/a_2$ as the opening degree command value $A^*_{SV}$ as represented by the above formula (3) when the determination portion 210 determines that the inflow condition is satisfied and the head pressure $P_{hPV}$ is less than the threshold value. In other words, the second signal outputted by the determination portion 210 is used as a signal for switching to a circuit in which the opening degree command value $A_{SV}$ which is the output signal from the reference opening degree command value calculation portion 220 is inputted to the second opening degree command value correction portion 232. Then, the opening degree command value calculation portion 215 transmits the opening degree command value $A_{SV}$ to the valve 106 when the determination portion 210 determines that the inflow condition is not satisfied. In other words, the third signal outputted by the determination portion 210 is used as a signal for switching to a circuit in which the opening degree command value $A_{SV}$ which is the output signal from the reference opening degree command value calculation portion 220 is inputted as it is to the valve 106 of the hydraulic unit 100.

Figure 11:
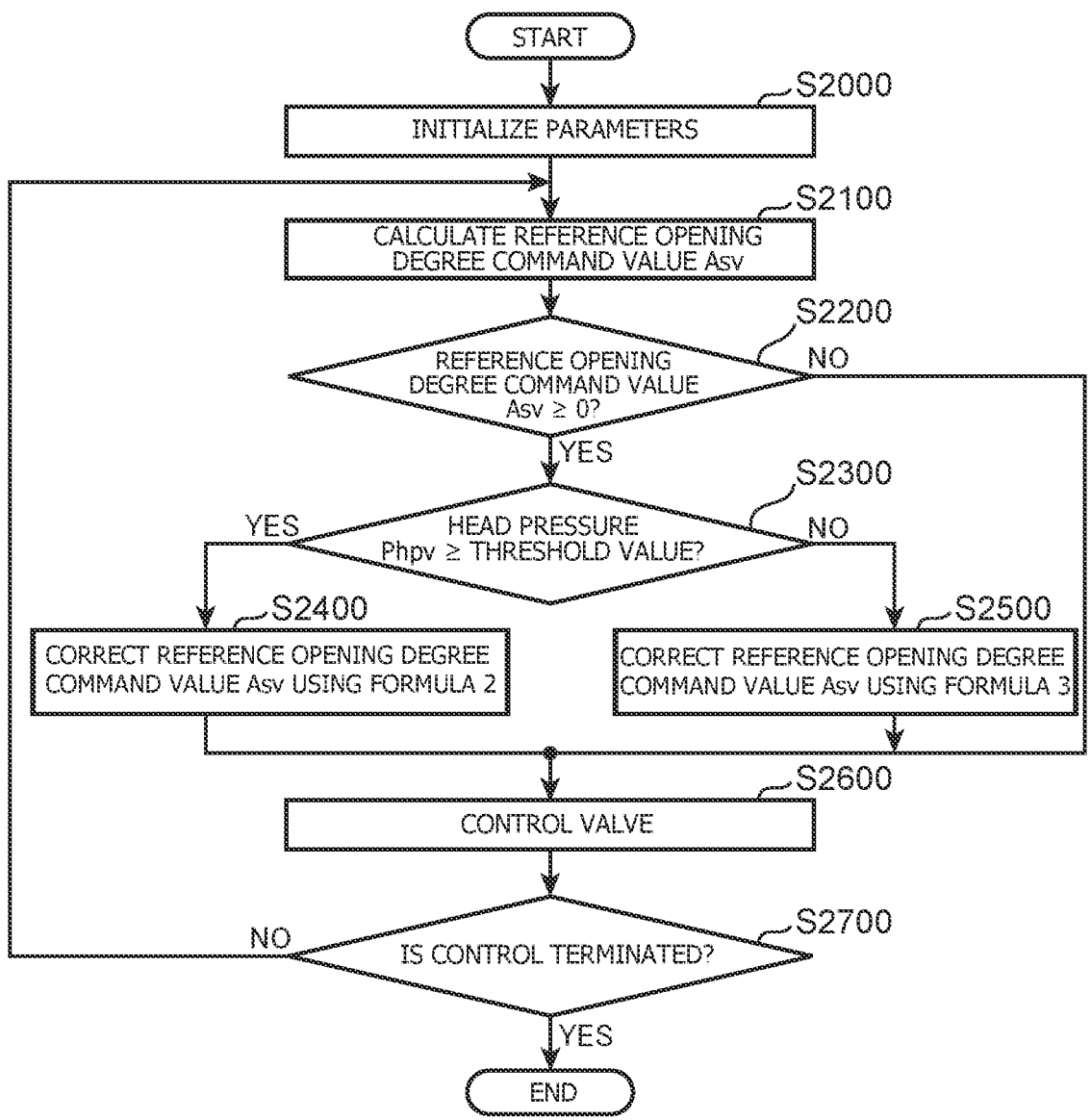
FIG. 11 is a flowchart of the control unit as illustrated in FIG. 7.

The control process of the control unit 200 as described above will be described with reference to a flowchart as illustrated in FIG. 11.

Step S2000, step S2100, and step S2200 are respectively identical to step S1000, step S1100, and step S1200 in the first embodiment.

In the present embodiment, when the reference opening degree command value $A_{SV}$ is a positive value (YES at step S2200), the determination portion 210 determines whether or not the head pressure $P_{hPV}$ is greater than or equal to the threshold value (step S2300). As a result, when the head pressure $P_{hPV}$ is greater than or equal to the threshold value (YES at step S2300), the first opening degree command value correction portion 231 of the opening degree command value calculation portion 215 calculates the opening degree command value $A^*_{SV}$ on the basis of the above formula (2) (step S2400) and transmits this value to the valve 106. On the other hand, when the head pressure $P_{hPV}$ is less than the threshold value (NO at step S2300), the second opening degree command value correction portion 232 of the opening degree command value calculation portion 215 calculates the opening degree command value $A^*_{SV}$ on the basis of the above formula (3) (step S2500) and transmits this value to the valve 106.

Moreover, when the reference opening degree command value $A_{SV}$ is a negative value (NO at step S2200), the opening degree command value calculation portion 215 transmits the reference opening degree command value $A_{SV}$ to the valve 106.

On the basis of the command values $A^*_{SV}$, $A_{SV}$ calculated as described above, the valve 106 is controlled (step S2500).

Subsequent step S2700 is identical to step S1500 in the first embodiment.

As described above, in the present embodiment, the opening degree command value calculation portion 215 transmits to the valve 106 the reference opening degree command value $A_{SV}$ multiplied by a first inclination ratio $a_{base}/a_1$ as the opening degree command value when the determination portion 210 determines that the inflow condition is satisfied and the head pressure $P_{hPV}$ is greater than or equal to the threshold value, and transmits to the valve 106 the reference opening degree command value $A_{SV}$ multiplied by a second inclination ratio $a_{base}/a_2$ as the opening degree command value when the determination portion 210 determines that the inflow condition is satisfied and the head pressure $P_{hPV}$ is less than the threshold value.

Accordingly, destabilization of a reciprocating movement of the rod 103 is further reliably prevented. Specifically, the second positive side inclination $a_2$ is greater than the first positive side inclination $a_1$, so that when the head pressure $P_{hPV}$ is greater than or equal to the threshold value and when the head pressure $P_{hPV}$ is less than the threshold value, the reference opening degree command value $A_{SV}$ is multiplied by respective inclination ratios, whereby destabilization of a reciprocating movement of the rod 103 is further prevented.

[Third Embodiment]

Next, the hydraulic drive device according to a third embodiment of the present invention will be described with reference to FIGS. 12 to 16. Note that in the third embodiment, description will be made only on parts different from those in the first embodiment and the second embodiment, and description of a structure, working, and effects identical to those in the first embodiment and the second embodiment is omitted.

In the first embodiment and the second embodiment, the reference opening degree command value $A_{SV}$ is multiplied by the inclination ratio such that the positive side inclinations $a_{on}$, and $a_1$ and $a_2$ when the reference opening degree command value $A_{SV}$ is a positive value are respectively equal to the negative side inclinations $a_{off}$ and $a_{base}$ when the reference opening degree command value $A_{SV}$ is a negative value, whereby the opening degree command value is calculated.

Figure 12:
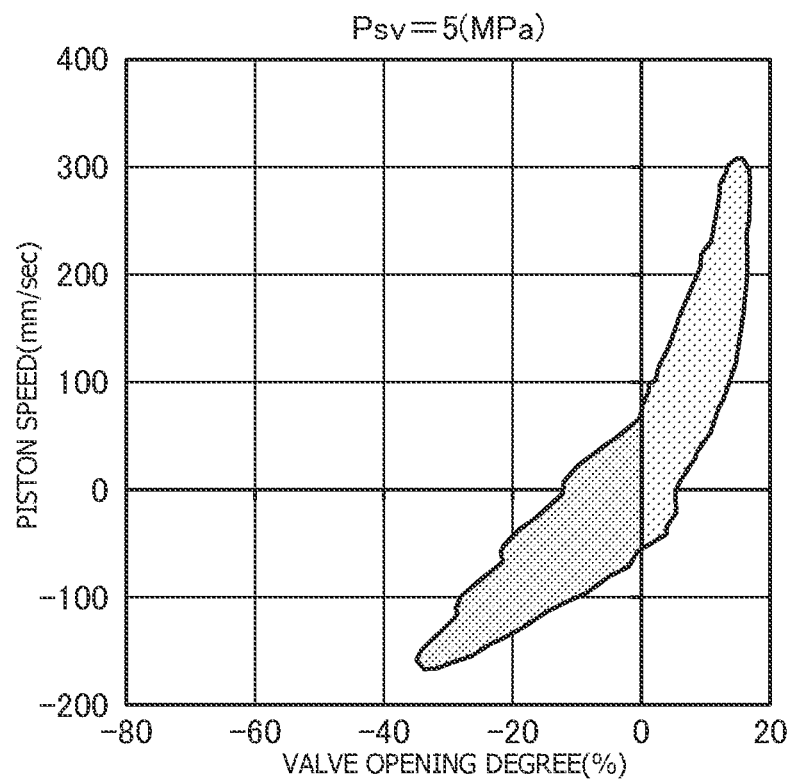
FIG. 12 is a graph illustrating a relationship between the opening degree command value and the piston speed when a target cylinder pressure is 5 MPa.
Figure 13:
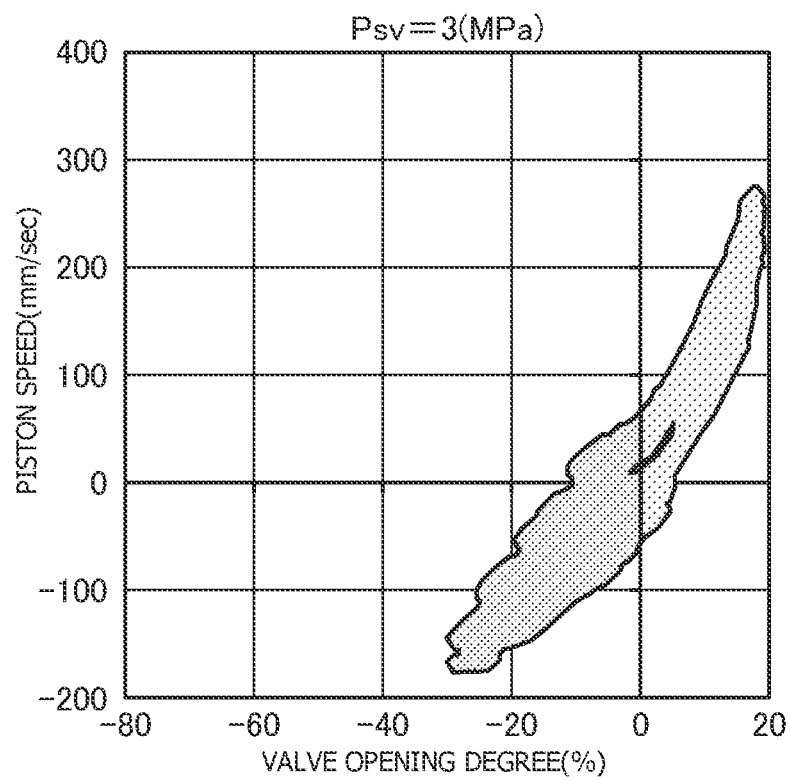
FIG. 13 is a graph illustrating a relationship between the opening degree command value and the piston speed when the target cylinder pressure is 3 MPa.

However, the relationship between the opening degree command value and a flow rate of the oil passing the valve 106 changes in accordance with not only the reference opening degree command value $A_{SV}$ but also the other factors. For example, as illustrated in FIGS. 12 to 14, the relationship differs in accordance with a value of the target cylinder pressure $P_{SV}$. Consequently, the control based on the particular target cylinder pressure $P_{SV}$ as in the first embodiment and the second embodiment insufficiently follows changes in the target cylinder pressure $P_{SV}$.

Accordingly, in the third embodiment, a model formula in consideration of factors which influence the relationship is constructed and on the basis of the model formula, the opening degree command value is calculated. In further detail, as the model formula, a first module formula which represents a relationship between the rod pressure $P_{rPV}$ and the opening degree command value and a second model formula which represents a relationship between the cylinder pressure $P_{PV}$ and the opening degree command value are constructed, and on the basis of these model formulas, the opening degree command value is calculated.

Herein, a reason for constructing the first model formula in consideration of the rod pressure $P_{rPV}$ and the second model formula in consideration of the cylinder pressure $P_{PV}$ is as follows. In short, since when the head pressure $P_{hPV}$ becomes less than or equal to a predetermined value, the hydraulic oil flows into the head chamber 101h through the merging flow passage 114, the head pressure remains at a substantially constant value while the hydraulic oil flows into the head chamber 101h through the merging flow passage 114. Thus, when the head pressure $P_{hPV}$ is greater than or equal to a threshold value which is greater than a value thereof, it is considered that inflow of the hydraulic oil into the head chamber 101h through the merging flow passage 114 and occurrence of cavitation substantially fail to happen. Accordingly, when the head pressure $P_{hPV}$ is greater than or equal to the threshold value, both the head pressure $P_{hPV}$ and the rod pressure $P_{rPV}$ are reliable, so that desirably, the opening degree command value is calculated on the basis of the second model formula based on the cylinder pressure $P_{PV}$ calculated on the basis of both the head pressure $P_{hPV}$ and the rod pressure $P_{rPV}$. On the other hand, when the head pressure $P_{hPV}$ is less than the threshold value, in other words, when it is feared that cavitation occurs in the head chamber 101h, the head pressure $P_{hPV}$ is not very reliable, so that desirably, the opening degree command value is calculated on the basis of the first model formula based on the rod pressure $P_{rPV}$ which is reliable.

Thus, it is possible to flexibly follow changes in factors which influence the relationship and realize the control having a further high versatility. Hereinafter, the present embodiment will be described in detail.

Figure 15:
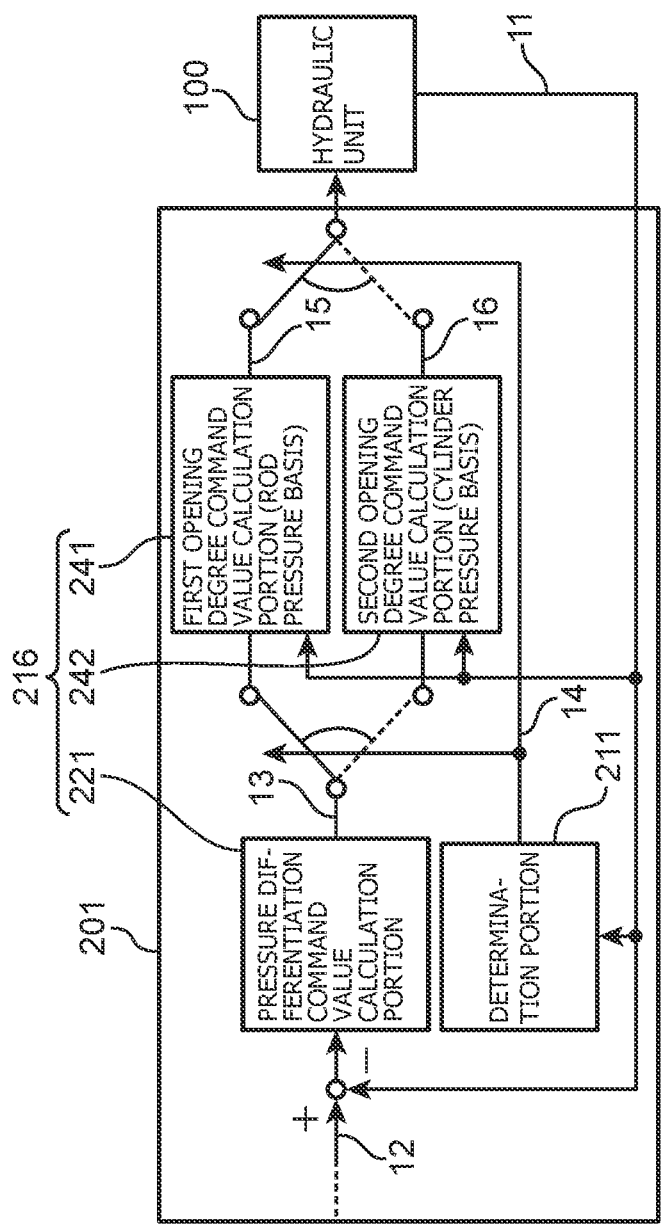
FIG. 15 is a block diagram of a control unit of the hydraulic drive device according to a third embodiment of the present invention.

As illustrated in FIG. 15, a control unit 201 includes a determination portion 211 and an opening degree command value calculation portion 216.

The determination portion 211 determines whether or not the inflow condition is satisfied. In the present embodiment, to the determination portion 211, the head pressure $P_{hPV}$ from among information included in a measured value 11 of the hydraulic unit 100 is inputted. The determination portion 211 determines that the inflow condition is satisfied when the head pressure $P_{hPV}$ is less than the threshold value, and determines that the inflow condition is not satisfied when the head pressure $P_{hPV}$ is greater than or equal to the threshold value. The determination portion 211 outputs a first signal when the head pressure $P_{hPV}$ is less than the threshold value (when determining that the inflow condition is satisfied), and outputs a second signal when the head pressure $P_{hPV}$ is greater than or equal to the threshold value (when determining that the inflow condition is not satisfied).

Herein, a reason for employing the head pressure $P_{hPV}$ as an index for determining whether or not the inflow condition is satisfied is as follows. In short, when the head pressure $P_{hPV}$ is greater than or equal to the threshold value which is greater than a value thereof, it is considered that inflow of the hydraulic oil into the head chamber 101h through the merging flow passage 114 and occurrence of cavitation in the head chamber 101h substantially fail to happen. On the other hand, when the head pressure $P_{hPV}$ is less than the threshold value, it is possible to determine that the inflow condition is satisfied.

The opening degree command value calculation portion 216 calculates the reference opening degree command value $A_{SV}$ on the basis of the first model formula when the determination portion 211 determines that the inflow condition is satisfied, and calculates the reference opening degree command value $A_{SV}$ on the basis of the second model formula when the determination portion 211 determines that the inflow condition is not satisfied. Specifically, the opening degree command value calculation portion 216 includes a pressure differentiation command value calculation unit 221, a first opening degree command value calculation portion 241 which calculates the reference opening degree command value $A_{SV}$ on the basis of the first model formula, and a second opening degree command value calculation portion 242 which calculates the reference opening degree command value $A_{SV}$ on the basis of the second model formula.

The pressure differentiation command value calculation unit 221 calculates a pressure differentiation command value $P'_{SV}$ represented by the target cylinder pressure $P_{SV}$ minus the cylinder pressure $P_{PV}$ (a measured value). Specifically, as illustrated in FIG. 15, to the pressure differentiation command value calculation unit 221, a signal 12 including the target cylinder pressure $P_{SV}$ and the measured value 11 (the cylinder pressure $P_{PV}$ inclusive) are inputted, and the pressure differentiation command value calculation unit 221 calculates the pressure differentiation command value $P'_{SV}$ on the basis of the below formula (4).

[Mathematical Formula 4]

$$P'_{SV}=P_{SV}-P_{PV} \quad (4)$$

The second opening degree command value calculation portion 242 calculates the opening degree command value $A_{SV}$ on the basis of the second formula representing the relationship between the cylinder pressure $P_{PV}$ and the opening degree command value, and transmits the opening degree command value $A_{SV}$ (a signal 16) to the valve 106 when the determination portion 211 determines that the inflow condition is not satisfied. In other words, the second signal outputted by the determination portion 211 is used as a signal for switching to a circuit in which the pressure differentiation command value $P'_{SV}$ which is an output signal 13 from the pressure differentiation command value calculation unit 221 is inputted to the second opening degree command value calculation portion 242. A reason for employing the cylinder pressure $P_{PV}$ as a factor for calculating the opening degree command value $A_{SV}$ in the second model formula is as follows. In short, when the head pressure $P_{hPV}$ is greater than or equal to the threshold value, both the head pressure $P_{hPV}$ and the rod pressure $P_{rPV}$ are reliable so that the second opening degree command value calculation portion 242 calculates the opening degree command value $A_{SV}$ on the basis of the second model formula including the cylinder pressure $P_{PV}$ calculated on the basis of both the head pressure $P_{hPV}$ and the rod pressure $P_{rPV}$.

As illustrated in FIG. 15, to the second opening degree command value calculation portion 242, in addition to the pressure differentiation command value $P'_{SV}$ which is the output signal 13 from the pressure differentiation command value calculation unit 221, a measured value of an opening degree (hereinafter referred to as "opening degree measured value") of the valve 106 from among information included in the measured value 11 is inputted. The second opening degree command value calculation portion 242 calculates the opening degree command value $A_{SV}$ on the basis of model formulas A consisting of the below formulas (5) to (7) when the opening degree measured value is a positive value, and calculates the opening degree command value $A_{SV}$ on the basis of model formulas B consisting of the below formulas (8) to (10) when the opening degree measured value is a negative value.

[Mathematical Formula 5]

$$A_{SV} = \frac{P'_{SV} \cdot S_r - \theta_{10} \cdot S_r + \theta_{30} \cdot S_h - (\theta_{11} \cdot S_r + \theta_{21} \cdot S_h) \cdot v_{PV}}{\alpha_1 \cdot S_r - \beta_1 \cdot S_h} (A_{SV} \geq 0) \quad (5)$$

[Mathematical Formula 6]

$$\alpha_1 = \theta_{12} \cdot \sqrt{P_{rPV} - P_{rmin}} \cdot \text{sign}(P_{rPV} - P_{rmin}) + \theta_{13} \cdot (P_{rPV} - P_{rmin}) \quad (6)$$

[Mathematical Formula 7]

$$\beta_1 = \theta_{32} \cdot \sqrt{P_p - P_{hPV}} \cdot \text{sign}(P_p - P_{hPV}) + \theta_{33} \cdot (P_p - P_{hPV}) \quad (7)$$

[Mathematical Formula 8]

$$A_{SV} = \frac{P'_{SV} \cdot S_r - \theta_{20} \cdot S_r + \theta_{40} \cdot S_h - (\theta_{11} \cdot S_r + \theta_{31} \cdot S_h) \cdot v_{PV}}{\alpha_2 \cdot S_r - \beta_2 \cdot S_h} (A_{SV} < 0) \quad (8)$$

[Mathematical Formula 9]

$$\alpha_2 = \theta_{22} \cdot \sqrt{P_p - P_{rPV}} \cdot \text{sign}(P_p - P_{rPV}) + \theta_{23} \cdot (P_p - P_{rPV}) \quad (9)$$

[Mathematical Formula 10]

$$\beta_2 = \theta_{42} \cdot \sqrt{P_{hPV} - P_{hmin}} \cdot \text{sign}(P_{hPV} - P_{hmin}) + \theta_{43} \cdot (P_{hPV} - P_{hmin}) \quad (10)$$

Herein, $S_r$ denotes a pressure receiving area on the side of the rod chamber 101r of the piston 102, $S_h$ denotes a pressure receiving area on the side of a head chamber 101h of the piston 102, $v_{PV}$ denotes a measured value of the piston speed (a rod speed), $P_{rPV}$ denotes a measured value of the rod pressure, $P_{hPV}$ denotes a measured value of the head pressure, $P_{rmin}$ denotes a minimum threshold value of the rod pressure, $P_{hmin}$ denotes a minimum threshold value of the head pressure, and PP denotes a pump pressure (a pressure of the hydraulic pump 107). Moreover, $\theta_{10}$, $\theta_{20}$, $\theta_{11}$, $\theta_{12}$, $\theta_{22}$, $\theta_{13}$, $\theta_{23}$, $\theta_{30}$, $\theta_{40}$, $\theta_{31}$, $\theta_{32}$, $\theta_{42}$, $\theta_{33}$, and $\theta_{43}$ are a coefficient for determining a model characteristic and can be determined using an approximation learning method, such as a least squares method. Note that the measured value $v_{PV}$ of the piston speed can be calculated, for example, by differentiation of a position sensor 118 provided with the rod 103. Moreover, the pump pressure is detected by a pressure sensor 119 provided with the hydraulic pump 107.

The first opening degree command value calculation portion 241 calculates the opening degree command value $A_{SV}$ on the basis of the first formula representing the relationship between the rod pressure $P_{rPV}$ and the opening degree command value, and transmits the opening degree command value $A_{SV}$ (a signal 15) to the valve 106 when the determination portion 211 determines that the inflow condition is not satisfied. In other words, the first signal outputted by the determination portion 211 is used as a signal for switching to a circuit in which the pressure differentiation command value $P'_{SV}$ which is the output signal 13 from the pressure differentiation command value calculation unit 221 is inputted to the first opening degree command value calculation portion 241. A reason for employing the rod pressure $P_{rPV}$ in place of the cylinder pressure $P_{PV}$ as a factor for calculating the opening degree command value $A_{SV}$ in the first model formula is as follows. In short, when the head pressure $P_{hPV}$ is less than the threshold value, in other words, when it is feared that cavitation occurs in the head chamber 101h, the head pressure $P_{hPV}$ is not very reliable, so that the first opening degree command value calculation portion 241 calculates the opening degree command value $A_{SV}$ on the basis of the first model formula including the rod pressure $P_{rPV}$ which is reliable.

As illustrated in FIG. 15, also to the first opening degree command value calculation portion 241, in addition to the pressure differentiation command value $P'_{SV}$ which is the output signal 13 from the pressure differentiation command value calculation unit 221, the opening degree measured value from among information included in the measured value 11 is inputted. The first opening degree command value calculation portion 241 calculates the opening degree command value $A_{SV}$ on the basis of a model formula C as represented by the below formula (11) when the opening degree measured value is a positive value, and calculates the opening degree command value $A_{SV}$ on the basis of a model formula D as represented by the below formula (12) when the opening degree measured value is a negative value.

[Mathematical Formula 11]

$$A_{SV} = \frac{P'_{rSV} - \theta_{10} - \theta_{11} \cdot v_{PV}}{\theta_{12} \cdot \sqrt{P_{rPV} - P_{rmin}} \cdot \text{sign}(P_{rPV} - P_{rmin}) + \theta_{13} \cdot (P_{rPV} - P_{rmin})} (A_{PV} \geq 0) \quad (11)$$

[Mathematical Formula 12]

$$A_{SV} = \frac{P'_{rSV} - \theta_{20} - \theta_{11} \cdot v_{PV}}{\theta_{22} \cdot \sqrt{P_p - P_{rPV}} \cdot \text{sign}(P_p - P_{rPV}) + \theta_{23} \cdot (P_p - P_{rPV})} (A_{PV} \geq 0) \quad (12)$$

Herein, $P'_{rSV}$ is a time differentiation value of the rod pressure as a target.

Figure 16:
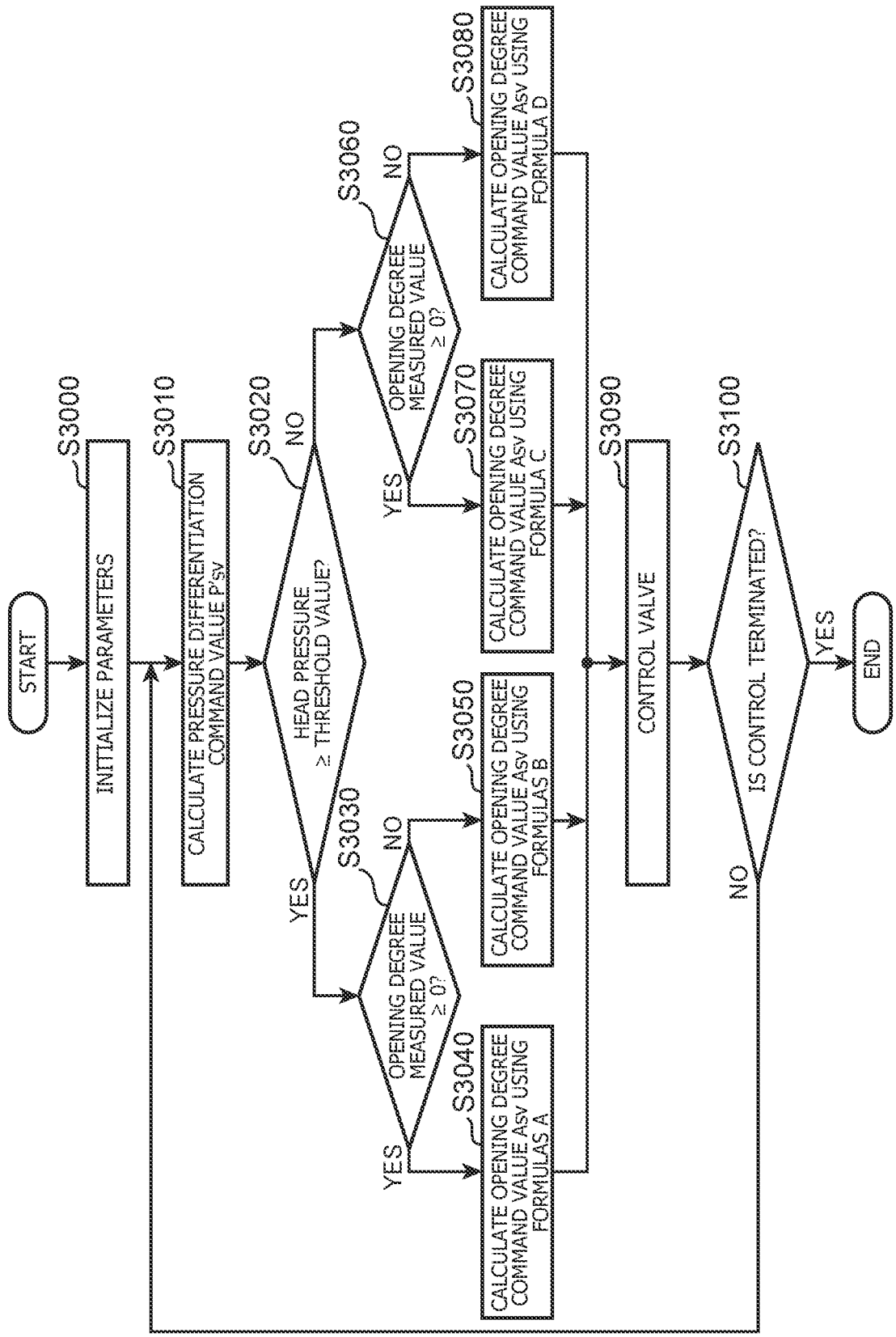
FIG. 16 is a flowchart of the control unit as illustrated in FIG. 15.

The control process of the control unit 201 as described above will be described with reference to a flowchart as illustrated in FIG. 16.

When the present hydraulic drive device is driven (when a supply of the hydraulic oil from the hydraulic pump 107 is started), first, parameters calculated in the past are initialized (step S3000). At this time, the cylinder pressure $P_{PV}$ from among information included in the measured value 11 of the hydraulic unit 100 is inputted to the pressure differentiation command value calculation unit 221, the head pressure $P_{hPV}$ from among information included in the measured value 11 is inputted to the determination portion 211, and the opening degree measured value, the piston speed $v_{PV}$, the pump pressure $P_p$, and the like from among the information included in the measured value 11 are inputted to the first opening degree command value calculation portion 241 and the second opening degree command value calculation portion 242.

Next, the pressure differentiation command value calculation unit 221 calculates the pressure differentiation command value $P'_{SV}$ on the basis of the signal 12 including the target cylinder pressure $P_{SV}$ and the measured value 11 (step S3010). This pressure differentiation command value $P'_{SV}$ (the signal 13) is inputted to the first opening degree command value calculation portion 241 and the second opening degree command value calculation portion 242.

Subsequently, the determination portion 211 determines whether or not the inflow condition is satisfied (whether or not the head pressure $P_{hPV}$ is less than the threshold value) (step S3020). As a result, when the head pressure $P_{hPV}$ is greater than or equal to the threshold value (YES at step S3020), the second opening degree command value calculation portion 242 determines whether or not the opening degree measured value is a positive value (step S3030). Then, when the opening degree measured value is a positive value (YES at step S3030), the second opening degree command value calculation portion 242 calculates the opening degree command value $A_{SV}$ on the basis of the model formulas A (step S3040) and transmits this value (the signal 16) to the valve 106. On the other hand, when the opening degree measured value is a negative value (NO at step S3030), the second opening degree command value calculation portion 242 calculates the opening degree command value $A_{SV}$ on the basis of the model formulas B (step S3050) and transmits this value (the signal 16) to the valve 106.

Moreover, when the head pressure $P_{hPV}$ is less than the threshold value (NO at step S3020), the first opening degree command value calculation portion 241 determines whether or not the opening degree measured value is a positive value (step S3060). Then, when the opening degree measured value is a positive value (YES at step S3060), the first opening degree command value calculation portion 241 calculates the opening degree command value $A_{SV}$ on the basis of the model formula C (step S3070) and transmits this value (the signal 15) to the valve 106. On the other hand, when the opening degree measured value is a negative value (NO at step S3060), the first opening degree command value calculation portion 241 calculates the opening degree command value $A_{SV}$ on the basis of the model formula D (step S3080) and transmits this value (the signal 15) to the valve 106.

On the basis of the opening degree command value $A_{SV}$ calculated as described above, the valve 106 is controlled (step S3090).

Next, the control unit 201 determines whether or not a predetermined termination condition is satisfied (step S3100). As a result, when the termination condition is satisfied (YES at step S3100), the control is terminated, and when the termination condition is not satisfied (NO at step S3100), a return to step S3010 is performed.

As described above, in the present embodiment, the control unit 201 calculates the opening degree command value $A_{SV}$ on the basis of the first model formula (the model formulas C and D) including not the head pressure $P_{hPV}$ which is not reliable but the rod pressure $P_{rPV}$ which is reliable when the head pressure $P_{hPV}$ is less than the threshold value, in other words, when it is feared that cavitation occurs in the head chamber 101h. On the other hand, the control unit 201 calculates the opening degree command value $A_{SV}$ on the basis of the second model formula (the model formulas A and B) including the cylinder pressure $P_{PV}$ calculated on the basis of both the head pressure $P_{hPV}$ and the rod pressure $P_{rPV}$, because both the head pressure $P_{hPV}$ and the rod pressure $P_{rPV}$ are reliable, when the head pressure $P_{hPV}$ is greater than or equal to the threshold value. Consequently, as compared with the first embodiment and the second embodiment, it is possible to calculate the opening degree command value $A_{SV}$ capable of flexibly following changes in factors which influence the relationship between the opening degree command value and a flow rate of the oil passing the valve 106. Thus, destabilization of a reciprocating movement of the piston 102 and the rod 103 is further effectively prevented, and the versatility is further improved.

Moreover, in the present embodiment, the control unit 201 calculates the opening degree command value $A_{SV}$ on the basis of the head pressure $P_{hPV}$ and the rod pressure $P_{rPV}$ as well as the pressure differentiation command value $P'_{SV}$, the time differentiation value of the target rod pressure $P'_{rSV}$, the piston speed $v_{PV}$, the pump pressure $P_p$, a pressure difference between the pump pressure $P_p$ and the rod pressure $P_{rPV}$, and a pressure difference between the pump pressure $P_p$ and the head pressure $P_{hPV}$. Thus, the opening degree command value $A_{SV}$ is calculated more accurately.

[Fourth Embodiment]

Next, the hydraulic drive device according to a fourth embodiment of the present invention will be described with reference to FIGS. 17 and 18. Note that in the fourth embodiment, description will be made only on parts different from those in the third embodiment, and description of a structure, working, and effects identical to those in the third embodiment and the second embodiment is omitted.

In the present embodiment, the time differentiation value of the target rod pressure $P'_{rSV}$ of the first model formula in the third embodiment is set to 0 (zero) so as to obtain a base opening degree command value A2, to which a correction command value A1 is separately added, whereby the opening degree command value $A_{SV}$ is calculated, and the pressure differentiation command value $P'_{SV}$ of the second model formula in the third embodiment is set to 0 (zero) so as to obtain the base opening degree command value A2, to which the correction command value A1 is separately added, whereby the opening degree command value $A_{SV}$ is calculated. Effects thus obtained are identical to those in the third embodiment. Hereinafter, the present embodiment will be described in detail.

Figure 17:
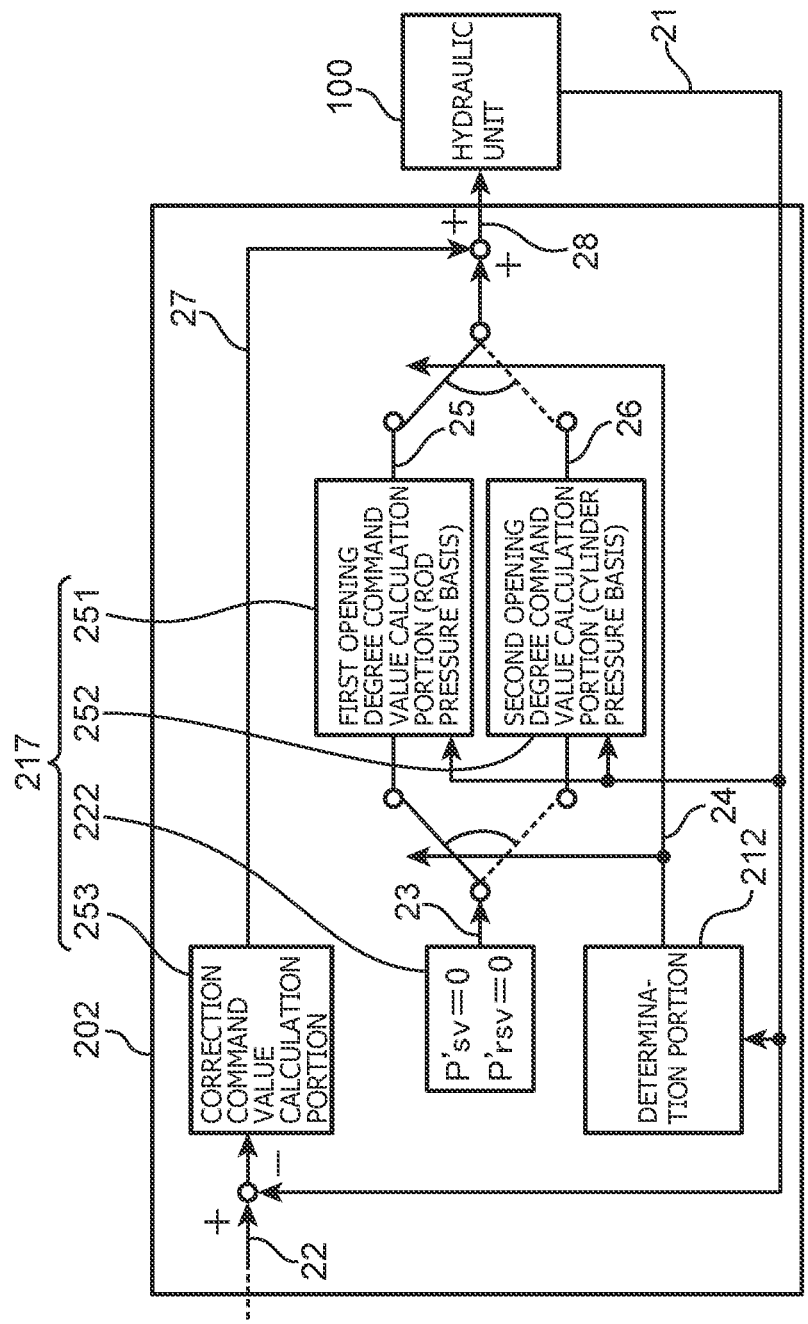
FIG. 17 is a block diagram of a control unit of the hydraulic drive device according to a fourth embodiment of the present invention.

As illustrated in FIG. 17, a control unit 202 includes a determination portion 212 and an opening degree command value calculation portion 217. Note that the determination portion 212 is identical to the determination portion 211 in the third embodiment.

The opening degree command value calculation portion 217 includes a zero signal output unit 222, a first opening degree command value calculation portion 251, a second opening degree command value calculation portion 252, and a correction command value calculation unit 253.

The zero signal output unit 222 generates such a signal 23 that the time differentiation value of the target rod pressure $P'_{rSV}$ and the pressure differentiation command value $P'_{SV}$ are constantly 0 and outputs the same to the first opening degree command value calculation portion 251 and the second opening degree command value calculation portion 252.

The first opening degree command value calculation portion 251 is identical to the first opening degree command value calculation portion 241 in the third embodiment. Note that such signal 23 that the time differentiation value of the target rod pressure $P'_{rSV}$ is 0 is inputted from the zero signal output unit 222, and accordingly the first opening degree command value calculation portion 251 calculates the base opening degree command value A2 (a signal 25) on the basis of the signal 23 and the model formula C or the model formula D.

The second opening degree command value calculation portion 252 is identical to the second opening degree command value calculation portion 242 in the third embodiment. Note that such signal 23 that the pressure differentiation command value $P'_{SV}$ is 0 is inputted from the zero signal output unit 222, and accordingly the second opening degree command value calculation portion 252 calculates the base opening degree command value A2 (a signal 26) on the basis of the signal 23 and the model formulas A or the model formulas B.

The correction command value calculation unit 253 calculates the correction command value A1 (a signal 27). Specifically, as illustrated in FIG. 17, to the correction command value calculation unit 253, a deviation between a signal 22 including the target cylinder pressure $P_{SV}$ and the measured value 11 of the hydraulic unit 100 (the cylinder pressure $P_{PV}$ inclusive), in other words, a value calculated on the basis of the above formula (4) is inputted, and the correction command value calculation unit 253 calculates the correction command value A2 (the signal 27) using the PID controller.

Figure 18:
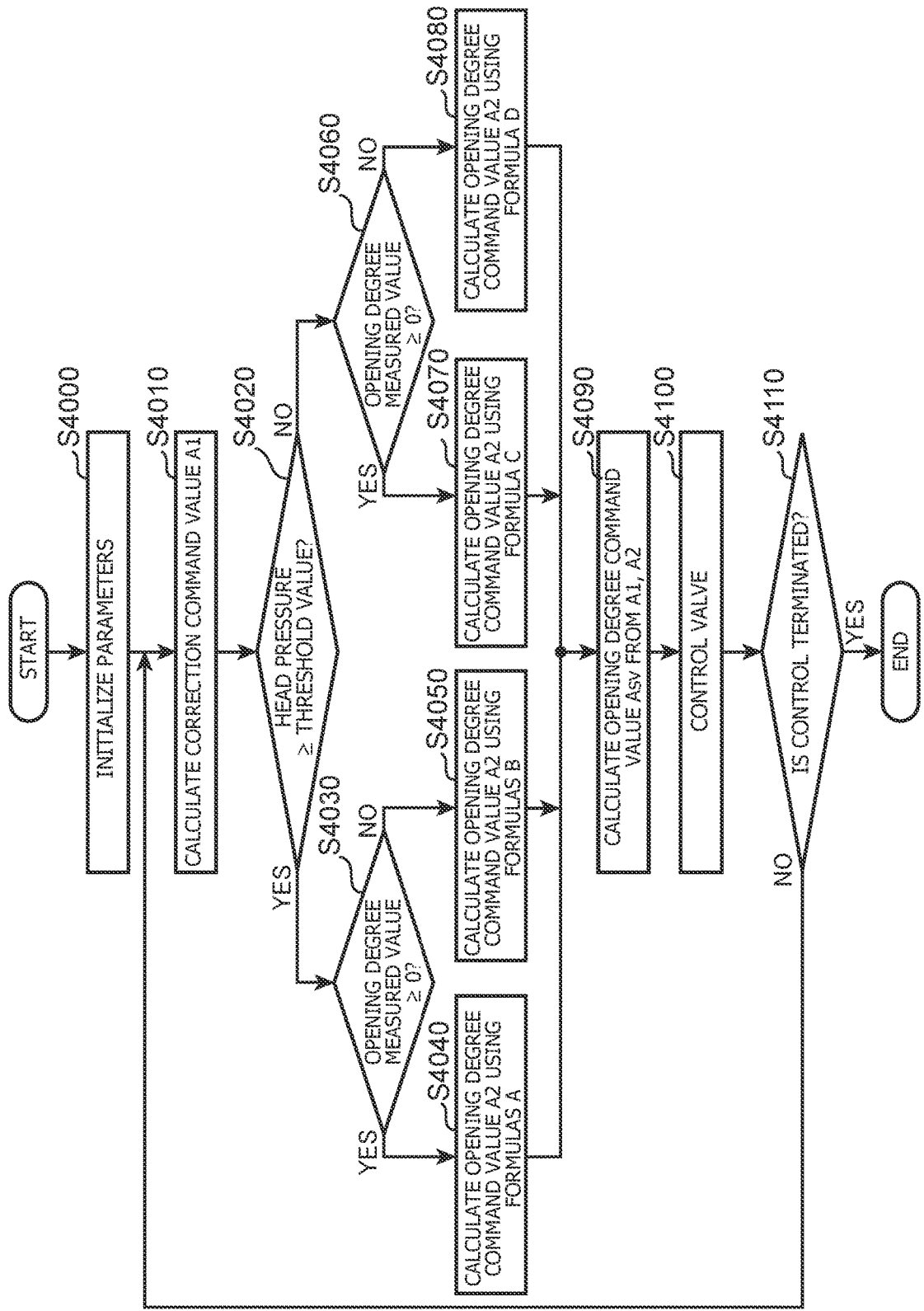
FIG. 18 is a flowchart of the control unit as illustrated in FIG. 17.

The control process of the control unit 202 as described above will be described with reference to a flowchart as illustrated in FIG. 18.

When the present hydraulic drive device is driven (when a supply of the hydraulic oil from the hydraulic pump 107 is started), first, parameters calculated in the past are initialized (step S4000). At this time, the cylinder pressure $P_{PV}$ from among information included in the measured value 21 of the hydraulic unit 100 is inputted to the correction command value calculation unit 253, the head pressure $P_{hPV}$ from among information included in the measured value 21 is inputted to the determination portion 212, and the opening degree measured value, the piston speed $v_{PV}$, the pump pressure $P_p$, and the like from among the information included in the measured value 21 are inputted to the first opening degree command value calculation portion 251 and the second opening degree command value calculation portion 252.

Next, the correction command value calculation unit 253 calculates the correction command value A1 (the signal 27) on the basis of the deviation between the signal 22 including the target cylinder pressure $P_{SV}$ and the measured value 21 (step S4010).

Step S4020, step S4030, and step S4060 are respectively identical to step S3020, step S3030, and step S3060 in the third embodiment. Moreover, step S4040, step S4050, step S4070, and step S4080 are respectively identical to step S3040, step S3050, step S3070, and step S3080 in the third embodiment except the following points.

In other words, at step S4040, to the pressure differentiation command value $P'_{SV}$ of the formulas A, 0 is inputted, whereby the base opening degree command value A2 (the signal 26) is calculated. At step S4050, to the pressure differentiation command value $P'_{SV}$ of the formulas B, 0 is inputted, whereby the base opening degree command value A2 (the signal 26) is calculated. At step S4070, to the time differentiation value of the target rod pressure $P'_{rSV}$ of the formula C, 0 is inputted, whereby the base opening degree command value A2 (the signal 25) is calculated. At step S4080, to the time differentiation value of the target rod pressure $P'_{rSV}$ of the formula D, 0 is inputted, whereby the base opening degree command value A2 (the signal 25) is calculated.

Then, to the base opening degree command value A2 (the signal 25 or the signal 26) calculated at any of step S4040, step S4050, step S4070, and step S4080, the correction command value A1 (the signal 27) calculated at step S4010 is added, whereby the opening degree command value $A_{SV}$ (a signal 28) is calculated (step S4090).

On the basis of the opening degree command value $A_{SV}$ (the signal 28) calculated as described above, the valve 106 is controlled (step S4100).

Next, the control unit 202 determines whether or not a predetermined termination condition is satisfied (step S4110). As a result, when the termination condition is satisfied (YES at step S4110), the control is terminated, and when the termination condition is not satisfied (NO at step S4110), a return to step S4010 is performed.

As described above, in the present embodiment, without calculating the pressure differentiation command value $P'_{SV}$ and the time differentiation value of the target rod pressure $P'_{rSV}$, the opening degree command value $A_{SV}$ can be calculated accurately similarly to the third embodiment.

Note that the embodiments disclosed herein are a mere example from every aspect and should be understood as being nonlimitative. The scope of the present invention is defined not by the description of the above embodiments but by the claims, and includes meanings equivalent to the claims and any modifications within the claims.

For example, in the above embodiments, as the load 105, a ram for kneading rubber is described by way of example, but the load 105 is not limited to the ram.

Hereinafter, the above embodiments will be generally described.

A hydraulic drive device according to the above embodiments includes a cylinder; a rod expandable and contractible with respect to the cylinder; a piston which is connected to the rod and divides the cylinder internally into a rod chamber and a head chamber; a hydraulic pump which delivers a hydraulic oil to the cylinder; a tank which stores the hydraulic oil flown from the cylinder; a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other; and a merging flow passage which allows at least a portion of the hydraulic oil from the rod chamber toward the tank to be merged into the hydraulic oil from the hydraulic pump toward the head chamber when the valve is in the positive state.

In the present hydraulic drive device, when a head pressure (a pressure of the hydraulic oil which is applied to the head chamber) is decreased while the valve is in the positive state, at least the part of the hydraulic oil from the rod chamber toward the tank flows into the head chamber through the merging flow passage, and accordingly, the head pressure is prevented from becoming a negative pressure. Thus, such a simple structure as to be provided with the merging flow passage can prevent cavitation from occurring in the head chamber.

Incidentally, since there is a certain relationship between an opening degree command value for determining an opening degree of the valve and a flow rate of the hydraulic oil passing the valve (a flow rate of the hydraulic oil flowing into the head chamber), when the hydraulic oil flows into the head chamber through the merging flow passage, the hydraulic oil having a flow rate greater than or equal to a flow rate corresponding to the opening degree command value flows into the head chamber. In such a case, the certain relationship is disturbed. In other words, when the constant opening degree command value is transmitted to the valve regardless of whether or not the hydraulic oil flows into the head chamber through the merging flow passage, a reciprocating movement of the piston and the rod may be destabilized.

Accordingly, the above hydraulic drive device further includes control unit which calculates an opening degree command value for determining an opening degree of the valve and transmits the opening degree command value to the valve. Preferably, the control unit includes: a determination portion which determines whether or not an inflow condition which indicates that the hydraulic oil flows into the head chamber through the merging flow passage is satisfied; and an opening degree command value calculation portion which calculates the opening degree command value on the basis of a predetermined relational expression and transmits the opening degree command value to the valve when the determination portion determines that the inflow condition is satisfied, and calculates the opening degree command value on the basis of a relational expression different from the predetermined relational expression and transmits the opening degree command value to the valve when the determination portion does not determine that the inflow condition is satisfied.

Thus, destabilization of a reciprocating movement of the piston and the rod is prevented. Specifically, the opening degree command value different depending on whether the inflow condition is determined to be satisfied or not determined to be satisfied is transmitted to the valve so that as compared with a case in which the same opening degree command value is transmitted to the valve regardless of whether or not the inflow condition is satisfied, a reciprocating movement of the piston and the rod is stabilized.

For example, the determination portion may determine that the inflow condition is satisfied when a reference opening degree command value is a positive value at which the valve is in the positive state, the reference opening degree command value being the opening degree command value of the valve when a target cylinder pressure is obtained, the target cylinder pressure being a target and a cylinder pressure calculated on the basis of a head pressure as a pressure of the hydraulic oil which is applied to the head chamber and a rod pressure as a pressure of the hydraulic oil which is applied to the rod chamber, and the opening degree command value calculation portion may transmit a value less than the reference opening degree command value as the opening degree command value to the valve when the determination portion determines that the inflow condition is satisfied, and transmit the reference opening degree command value to the valve when the determination portion determines that the inflow condition is not satisfied.

Specifically, when the reference opening degree command value is a positive value, the valve is in the positive state (in a phase in which a volume of the head chamber increases) and thus it can be considered that a negative pressure is likely to be generated in the head chamber, in other words, the hydraulic oil is likely to flow into the head chamber through the merging flow passage. Thus, it is possible to determine that the inflow condition is satisfied when the reference opening degree command value is a positive value. Then, when the reference opening degree command value is a positive value, in other words, when it is feared that the hydraulic oil flows into the head chamber through the merging flow passage, a value less than the reference opening degree command value at which the target cylinder pressure is obtained is transmitted as the opening degree command value to the valve (an opening degree of the valve is set to an opening degree less than an opening degree at which the target cylinder pressure is obtained), so that disturbance of the certain relationship is prevented, whereby destabilization of a reciprocating movement of the rod is prevented.

In such a case, the opening degree command value calculation portion may transmit the reference opening degree command value multiplied by an inclination ratio of a negative side inclination to a positive side inclination, as the opening degree command value to the valve when the determination portion determines that the inflow condition is satisfied, the negative side inclination being represented by a ratio of an increment in a displacement speed of the piston to an increment in the opening degree command value when the reference opening degree command value is a negative value, the positive side inclination being greater than the negative side inclination and being represented by a ratio of an increment in the displacement speed of the piston to an increment in the opening degree command value when the reference opening degree command value is a positive value.

Thus, the relationship between the opening degree command value and a flow rate of the hydraulic oil flowing into the head chamber when the reference opening degree command value is a positive value is substantially identical to that when the reference opening degree command value is a negative value, so that destabilization of a reciprocating movement of the rod is further prevented. Generally, the positive side inclination (a ratio of an increment in the displacement speed of the piston to an increment in the opening degree command value when the reference opening degree command value is a positive value) is greater than the negative side inclination (a ratio of an increment in a displacement speed of the piston to an increment in the opening degree command value when the reference opening degree command value is a negative value). Accordingly, when the reference opening degree command value is a positive value, this reference opening degree command value is multiplied by the inclination ratio, whereby a displacement speed of the piston when the rod expands and a displacement speed of the piston when the rod contracts are substantially equal to each other, so that a reciprocating movement of the piston and the rod is stabilized.

Alternatively, the opening degree command value calculation portion may transmit the reference opening degree command value multiplied by a first inclination ratio of a negative side inclination to a first positive side inclination, as the opening degree command value to the valve when the determination unit determination portion determines that the inflow condition is satisfied and the head pressure is greater than or equal to a threshold value, the threshold value being greater than the head pressure when the hydraulic oil flows into the head chamber through the merging flow passage, the negative side inclination being represented by a ratio of an increment in a displacement speed of the rod to an increment in the opening degree command value when the opening degree command value is a negative value, the first positive side inclination being greater than the negative side inclination and being an inclination represented by a ratio of an increment in a displacement speed of the rod to an increment in the opening degree command value when the opening degree command value is a positive value and the head pressure is greater than or equal to the threshold value, and transmit the reference opening degree command value multiplied by a second inclination ratio of the negative side inclination to a second positive side inclination, as the opening degree command value to the valve when the determination unit determination portion determines that the inflow condition is satisfied and the head pressure is less than the threshold value, the second positive side inclination being greater than the negative side inclination and being an inclination represented by a ratio of an increment in a displacement speed of the rod to an increment in the opening degree command value when the opening degree command value is a positive value and the head pressure is less than the threshold value.

Accordingly, destabilization of a reciprocating movement of the rod is further reliably prevented. Specifically, the second positive side inclination is greater than the first positive side inclination so that when the head pressure is greater than or equal to the threshold value and when the head pressure is less than the threshold value, the reference opening degree command value is multiplied by respective inclination ratios, whereby destabilization of a reciprocating movement of the rod is further prevented.

Moreover, for example, the determination portion may determine that the inflow condition is satisfied when a head pressure as a pressure of the hydraulic oil which is applied to the head chamber is less than a threshold value which is greater than the head pressure when the hydraulic oil flows into the head chamber through the merging flow passage, and the opening degree command value calculation portion may calculate the opening degree command value on the basis of a first model formula, as the relational expression, the first model formula representing a relationship between the opening degree command value and a rod pressure as a pressure of the hydraulic oil which is applied to the rod chamber, and transmits the opening degree command value to the valve when the determination portion determines that the inflow condition is satisfied, and calculate the opening degree command value on the basis of a second model formula, as a relational expression different from the relational expression, the second model formula representing a relationship between the opening degree command value and a cylinder pressure calculated on the basis of the head pressure and the rod pressure, and transmits the opening degree command value to the valve when the determination portion determines that the inflow condition is not satisfied.

Specifically, since when the head pressure becomes less than or equal to a predetermined value, the hydraulic oil flows into the head chamber through the merging flow passage, the head pressure remains at a substantially constant value while the hydraulic oil flows into the head chamber through the merging flow passage. Thus, when the head pressure is greater than or equal to a threshold value which is greater than a value thereof, it is considered that inflow of the hydraulic oil into the head chamber through the merging flow passage and occurrence of cavitation in the head chamber substantially fail to happen. On the other hand, when the head pressure is less than the threshold value, it is possible to determine that the inflow condition is satisfied. Then, when the head pressure is less than the threshold value, in other words, when it is feared that cavitation occurs in the head chamber, the opening degree command value is calculated on the basis of the first model formula including not the head pressure which is not reliable but the rod pressure which is reliable. On the other hand, when the head pressure is greater than or equal to the threshold value, both the head pressure and the rod pressure are reliable so that the opening degree command value is calculated on the basis of the second model formula including both the head pressure and the rod pressure. Thus, the opening degree command value can be calculated accurately. Accordingly, destabilization of a reciprocating movement of the rod can be effectively prevented.

In such a case, preferably, the opening degree command value calculation portion calculates the opening degree command value on the basis of a model formula, as the first model formula, the model formula representing a relationship between the rod pressure and a piston speed which is a displacement speed of the piston, and the opening degree command value, and transmits the opening degree command value to the valve when the determination portion determines that the inflow condition is satisfied, and calculates the opening degree command value on the basis of a model formula, as the second model formula, the model formula representing a relationship between the cylinder pressure and the piston speed, and the opening degree command value, and transmits the opening degree command value to the valve when the determination portion determines that the inflow condition is not satisfied.

Thus, the opening degree command value can be calculated more accurately.

Moreover, preferably, in the present hydraulic drive device, the opening degree command value calculation portion calculates the opening degree command value on the basis of a model formula, as the second model formula, the model formula representing a relationship between the opening degree command value and a target cylinder pressure minus the cylinder pressure, the target cylinder pressure being the cylinder pressure and a target, and transmits the opening degree command value to the valve when the determination portion determines that the inflow condition is not satisfied.

Thus, the opening degree command value can be calculated further accurately.

Moreover, a method for controlling a hydraulic drive device according to the above embodiments, in which the hydraulic drive device including: a cylinder; a rod expandable and contractible with respect to the cylinder; a piston which is connected to the rod and divides the cylinder internally into a rod chamber and a head chamber; a hydraulic pump which delivers a hydraulic oil to the cylinder; a tank which stores the hydraulic oil flown from the cylinder; a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other; and a merging flow passage which allows at least a portion of the hydraulic oil from the rod chamber toward the tank to be merged into the hydraulic oil from the hydraulic pump toward the head chamber when the valve is in the positive state, includes: a determination step of determining whether or not an inflow condition which indicates that the hydraulic oil flows into the head chamber through the merging flow passage is satisfied; and an opening degree command value calculation step of calculating the opening degree command value on the basis of a predetermined relational expression and transmitting the opening degree command value to the valve when it is determined in the determination step that the inflow condition is satisfied, and calculating the opening degree command value on the basis of a relational expression different from the predetermined relational expression and transmitting the opening degree command value to the valve when it is not determined in the determination step that the inflow condition is satisfied.

For example, in the determination step, it may be determined that the inflow condition is satisfied when a reference opening degree command value is a positive value at which the valve is in the positive state, the reference opening degree command value being the opening degree command value of the valve when a target cylinder pressure is obtained, the target cylinder pressure being a target and a cylinder pressure calculated on the basis of a head pressure as a pressure of the hydraulic oil which is applied to the head chamber and a rod pressure as a pressure of the hydraulic oil which is applied to the rod chamber, and in the opening degree command value calculation step, a value less than the reference opening degree command value may be transmitted as the opening degree command value to the valve when it is determined in the determination step that the inflow condition is satisfied, and the reference opening degree command value be transmitted to the valve when it is determined in the determination step that the inflow condition is not satisfied.

Moreover, in the method for controlling the present hydraulic drive device, in the opening degree command value calculation step, the reference opening degree command value multiplied by an inclination ratio of a negative side inclination to a positive side inclination may be transmitted as the opening degree command value to the valve when it is determined in the determination step that the inflow condition is satisfied, the negative side inclination being represented by a ratio of an increment in a displacement speed of the piston to an increment in the opening degree command value when the reference opening degree command value is a negative value, the positive side inclination being greater than the negative side inclination and being represented by a ratio of an increment in the displacement speed of the piston to an increment in the opening degree command value when the reference opening degree command value is a positive value.

Alternatively, in the opening degree command value calculation step, when it is determined in the determination step that the inflow condition is satisfied and the head pressure is greater than or equal to a threshold value, the reference opening degree command value multiplied by a first inclination ratio of a negative side inclination to a first positive side inclination may be transmitted as the opening degree command value to the valve, the threshold value being greater than the head pressure when the hydraulic oil flows into the head chamber through the merging flow passage, the negative side inclination being represented by a ratio of an increment in a displacement speed of the rod to an increment in the opening degree command value when the opening degree command value is a negative value, the first positive side inclination being greater than the negative side inclination and being an inclination represented by a ratio of an increment in a displacement speed of the rod to an increment in the opening degree command value when the opening degree command value is a positive value and the head pressure is greater than or equal to the threshold value, and when it is determined in the determination step that the inflow condition is satisfied and the head pressure is less than the threshold value, the reference opening degree command value multiplied by a second inclination ratio of the negative side inclination to a second positive side inclination may be transmitted as the opening degree command value to the valve, the second positive side inclination being greater than the negative side inclination and being an inclination represented by a ratio of an increment in a displacement speed of the rod to an increment in the opening degree command value when the opening degree command value is a positive value and the head pressure is less than the threshold value.

Moreover, for example, in the determination step, it may be determined that the inflow condition is satisfied when a head pressure as a pressure of the hydraulic oil which is applied to the head chamber is less than a threshold value which is greater than the head pressure when the hydraulic oil flows into the head chamber through the merging flow passage, and in the opening degree command value calculation step, the opening degree command value may be calculated on the basis of a first model formula as the relational expression and be transmitted to the valve when it is determined in the determination step that the inflow condition is satisfied, the first model formula representing a relationship between the opening degree command value and a rod pressure as a pressure of the hydraulic oil which is applied to the rod chamber, and the opening degree command value may be calculated on the basis of a second model formula as a relational expression different from the relational expression and be transmitted to the valve when it is determined in the determination step that the inflow condition is not satisfied, the second model formula representing a relationship between the opening degree command value and a cylinder pressure calculated on the basis of the head pressure and the rod pressure.

Specifically, preferably, in the opening degree command value calculation step, the opening degree command value is calculated on the basis of a model formula as the first model formula and is transmitted to the valve when it is determined in the determination step that the inflow condition is satisfied, the model formula representing a relationship between the rod pressure and a piston speed which is a displacement speed of the piston, and the opening degree command value, and the opening degree command value is calculated on the basis of a model formula as the second model formula and is transmitted to the valve when it is determined in the determination step that the inflow condition is not satisfied, the model formula representing a relationship between the cylinder pressure and the piston speed, and the opening degree command value.

Moreover, preferably, in the method for controlling the present hydraulic drive device, in the opening degree command value calculation step, the opening degree command value is calculated on the basis of a model formula as the second model formula and is transmitted to the valve when it is determined in the determination step that the inflow condition is not satisfied, the model formula representing a relationship between the opening degree command value and a target cylinder pressure minus the cylinder pressure, the target cylinder pressure being the cylinder pressure and a target.

The invention claimed is:
1. A hydraulic drive device, comprising:
 a cylinder;
 a rod expandable and contractible with respect to the cylinder;
 a piston which is connected to the rod and divides the cylinder internally into a rod chamber and a head chamber;
 a hydraulic pump which delivers a hydraulic oil to the cylinder;
 a tank which stores the hydraulic oil flown from the cylinder;
 a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other;

a merging flow passage which allows at least a portion of the hydraulic oil from the rod chamber toward the tank to be merged into the hydraulic oil from the hydraulic pump toward the head chamber when the valve is in the positive state; and a control unit which calculates an opening degree command value for determining an opening degree of the valve and transmits the opening degree command value to the valve, wherein the control unit includes:

a determination portion which determines whether or not an inflow condition which indicates that the hydraulic oil flows into the head chamber through the merging flow passage is satisfied; and an opening degree command value calculation portion which calculates the opening degree command value on the basis of a predetermined relational expression and transmits the opening degree command value to the valve when the determination portion determines that the inflow condition is satisfied, and calculates the opening degree command value on the basis of a relational expression different from the predetermined relational expression and transmits the opening degree command value to the valve when the determination portion does not determine that the inflow condition is satisfied.

2. The hydraulic drive device according to claim 1, wherein the determination portion determines that the inflow condition is satisfied when a reference opening degree command value is a positive value at which the valve is in the positive state, the reference opening degree command value being the opening degree command value of the valve when a target cylinder pressure is obtained, the target cylinder pressure being a target and a cylinder pressure calculated on the basis of a head pressure as a pressure of the hydraulic oil which is applied to the head chamber and a rod pressure as a pressure of the hydraulic oil which is applied to the rod chamber, and the opening degree command value calculation portion transmits a value less than the reference opening degree command value as the opening degree command value to the valve when the determination portion determines that the inflow condition is satisfied, and transmits the reference opening degree command value to the valve when the determination portion determines that the inflow condition is not satisfied.

3. The hydraulic drive device according to claim 2, wherein the opening degree command value calculation portion transmits the reference opening degree command value multiplied by an inclination ratio of a negative side inclination to a positive side inclination, as the opening degree command value to the valve when the determination portion determines that the inflow condition is satisfied, the negative side inclination being represented by a ratio of an increment in a displacement speed of the piston to an increment in the opening degree command value when the reference opening degree command value is a negative value, the positive side inclination being greater than the negative side inclination and being represented by a ratio of an increment in the displacement speed of the piston to an increment in the opening degree command value when the reference opening degree command value is a positive value.

4. The hydraulic drive device according to claim 2, wherein the opening degree command value calculation portion transmits the reference opening degree command value multiplied by a first inclination ratio of a negative side inclination to a first positive side inclination, as the opening degree command value to the valve when the determination unit determination portion determines that the inflow condition is satisfied and the head pressure is greater than or equal to a threshold value, the threshold value being greater than the head pressure when the hydraulic oil flows into the head chamber through the merging flow passage, the negative side inclination being represented by a ratio of an increment in a displacement speed of the rod to an increment in the opening degree command value when the opening degree command value is a negative value, the first positive side inclination being greater than the negative side inclination and being an inclination represented by a ratio of an increment in a displacement speed of the rod to an increment in the opening degree command value when the opening degree command value is a positive value and the head pressure is greater than or equal to the threshold value, and transmits the reference opening degree command value multiplied by a second inclination ratio of the negative side inclination to a second positive side inclination, as the opening degree command value to the valve when the determination unit determination portion determines that the inflow condition is satisfied and the head pressure is less than the threshold value, the second positive side inclination being greater than the negative side inclination and being an inclination represented by a ratio of an increment in a displacement speed of the rod to an increment in the opening degree command value when the opening degree command value is a positive value and the head pressure is less than the threshold value.

5. The hydraulic drive device according to claim 1, wherein the determination portion determines that the inflow condition is satisfied when a head pressure as a pressure of the hydraulic oil which is applied to the head chamber is less than a threshold value which is greater than the head pressure when the hydraulic oil flows into the head chamber through the merging flow passage, and the opening degree command value calculation portion calculates the opening degree command value on the basis of a first model formula, as the relational expression, the first model formula representing a relationship between the opening degree command value and a rod pressure as a pressure of the hydraulic oil which is applied to the rod chamber, and transmits the opening degree command value to the valve when the determination portion determines that the inflow condition is satisfied, and calculates the opening degree command value on the basis of a second model formula, as a relational expression different from the relational expression, the second model formula representing a relationship between the opening degree command value and a cylinder pressure calculated on the basis of the head pressure and the rod pressure, and transmits the opening degree command value to the valve when the determination portion determines that the inflow condition is not satisfied.

6. The hydraulic drive device according to claim 5, wherein the opening degree command value calculation portion calculates the opening degree command value on the basis of a model formula, as the first model formula, the model formula representing a relationship between the rod pressure and a piston speed which is a displacement speed of the piston, and the opening degree command value, and transmits the opening degree command value to the valve when the determination portion determines that the inflow condition is satisfied, and calculates the opening degree command value on the basis of a model formula, as the second model formula, the model formula representing a relationship between the cylinder pressure and the piston speed, and the opening degree command value, and transmits the opening degree command value to the valve when the determination portion determines that the inflow condition is not satisfied.

7. The hydraulic drive device according to claim 5, wherein the opening degree command value calculation portion calculates the opening degree command value on the basis of a model formula, as the second model formula, the model formula representing a relationship between the opening degree command value and a target cylinder pressure minus the cylinder pressure, the target cylinder pressure being the cylinder pressure and a target, and transmits the opening degree command value to the valve when the determination portion determines that the inflow condition is not satisfied.

8. A method for controlling a hydraulic drive device, the hydraulic drive device comprising:
   a cylinder;
   a rod expandable and contractible with respect to the cylinder;
   a piston which is connected to the rod and divides the cylinder internally into a rod chamber and a head chamber;
   a hydraulic pump which delivers a hydraulic oil to the cylinder;
   a tank which stores the hydraulic oil flown from the cylinder;
   a valve switchable between a positive state in which the hydraulic pump and the head chamber are connected to each other and the rod chamber and the tank are connected to each other and a negative state in which the hydraulic pump and the rod chamber are connected to each other and the head chamber and the tank are connected to each other; and
   a merging flow passage which allows at least a portion of the hydraulic oil from the rod chamber toward the tank to be merged into the hydraulic oil from the hydraulic pump toward the head chamber when the valve is in the positive state,
   the method comprising:
   a determination step of determining whether or not an inflow condition which indicates that the hydraulic oil flows into the head chamber through the merging flow passage is satisfied; and
   an opening degree command value calculation step of calculating the opening degree command value on the basis of a predetermined relational expression and transmitting the opening degree command value to the valve when it is determined in the determination step that the inflow condition is satisfied, and calculating the opening degree command value on the basis of a relational expression different from the predetermined relational expression and transmitting the opening degree command value to the valve when it is not determined in the determination step that the inflow condition is satisfied.

9. The method for controlling the hydraulic drive device according to claim 8,
   wherein in the determination step, it is determined that the inflow condition is satisfied when a reference opening degree command value is a positive value at which the valve is in the positive state, the reference opening degree command value being the opening degree command value of the valve when a target cylinder pressure is obtained, the target cylinder pressure being a target and a cylinder pressure calculated on the basis of a head pressure as a pressure of the hydraulic oil which is applied to the head chamber and a rod pressure as a pressure of the hydraulic oil which is applied to the rod chamber, and
   in the opening degree command value calculation step, a value less than the reference opening degree command value is transmitted as the opening degree command value to the valve when it is determined in the determination step that the inflow condition is satisfied, and the reference opening degree command value is transmitted to the valve when it is determined in the determination step that the inflow condition is not satisfied.

10. The method for controlling the hydraulic drive device according to claim 9,
    wherein in the opening degree command value calculation step, the reference opening degree command value multiplied by an inclination ratio of a negative side inclination to a positive side inclination is transmitted as the opening degree command value to the valve when it is determined in the determination step that the inflow condition is satisfied, the negative side inclination being represented by a ratio of an increment in a displacement speed of the piston to an increment in the opening degree command value when the reference opening degree command value is a negative value, the positive side inclination being greater than the negative side inclination and being represented by a ratio of an increment in the displacement speed of the piston to an increment in the opening degree command value when the reference opening degree command value is a positive value.

11. The method for controlling the hydraulic drive device according to claim 9,
    wherein in the opening degree command value calculation step,
    when it is determined in the determination step that the inflow condition is satisfied and the head pressure is greater than or equal to a threshold value, the reference opening degree command value multiplied by a first inclination ratio of a negative side inclination to a first positive side inclination is transmitted as the opening degree command value to the valve, the threshold value being greater than the head pressure when the hydraulic oil flows into the head chamber through the merging flow passage, the negative side inclination being represented by a ratio of an increment in a displacement speed of the rod to an increment in the opening degree command value when the opening degree command value is a negative value, the first positive side inclination being greater than the negative side inclination and being an inclination represented by a ratio of an increment in a displacement speed of the rod to an increment in the opening degree command value when the opening degree command value is a positive value and the head pressure is greater than or equal to the threshold value, and when it is determined in the determination step that the inflow condition is satisfied and the head pressure is less than the threshold value, the reference opening degree command value multiplied by a second inclination ratio of the negative side inclination to a second positive side inclination is transmitted as the opening degree command value to the valve, the second positive side inclination being greater than the negative side inclination and being an inclination represented by a ratio of an increment in a displacement speed of the rod to an increment in the opening degree command value when the opening degree command value is a positive value and the head pressure is less than the threshold value.

12. The method for controlling the hydraulic drive device according to claim 8, wherein in the determination step, it is determined that the inflow condition is satisfied when a head pressure as a pressure of the hydraulic oil which is applied to the head chamber is less than a threshold value which is greater than the head pressure when the hydraulic oil flows into the head chamber through the merging flow passage, and in the opening degree command value calculation step, the opening degree command value is calculated on the basis of a first model formula as the relational expression and is transmitted to the valve when it is determined in the determination step that the inflow condition is satisfied, the first model formula representing a relationship between the opening degree command value and a rod pressure as a pressure of the hydraulic oil which is applied to the rod chamber, and the opening degree command value is calculated on the basis of a second model formula as a relational expression different from the relational expression and is transmitted to the valve when it is determined in the determination step that the inflow condition is not satisfied, the second model formula representing a relationship between the opening degree command value and a cylinder pressure calculated on the basis of the head pressure and the rod pressure.

13. The method for controlling the hydraulic drive device according to claim 12, wherein in the opening degree command value calculation step, the opening degree command value is calculated on the basis of a model formula as the first model formula and is transmitted to the valve when it is determined in the determination step that the inflow condition is satisfied, the model formula representing a relationship between the rod pressure and a piston speed which is a displacement speed of the piston, and the opening degree command value, and the opening degree command value is calculated on the basis of a model formula as the second model formula and is transmitted to the valve when it is determined in the determination step that the inflow condition is not satisfied, the model formula representing a relationship between the cylinder pressure and the piston speed, and the opening degree command value.

14. The method for controlling the hydraulic drive device according to claim 12, wherein in the opening degree command value calculation step, the opening degree command value is calculated on the basis of a model formula as the second model formula and is transmitted to the valve when it is determined in the determination step that the inflow condition is not satisfied, the model formula representing a relationship between the opening degree command value and a target cylinder pressure minus the cylinder pressure, the target cylinder pressure being the cylinder pressure and a target.

15. The hydraulic drive device according to claim 6, wherein the opening degree command value calculation portion calculates the opening degree command value on the basis of a model formula, as the second model formula, the model formula representing a relationship between the opening degree command value and a target cylinder pressure minus the cylinder pressure, the target cylinder pressure being the cylinder pressure and a target, and transmits the opening degree command value to the valve when the determination portion determines that the inflow condition is not satisfied.

16. The method for controlling the hydraulic drive device according to claim 13, wherein in the opening degree command value calculation step, the opening degree command value is calculated on the basis of a model formula as the second model formula and is transmitted to the valve when it is determined in the determination step that the inflow condition is not satisfied, the model formula representing a relationship between the opening degree command value and a target cylinder pressure minus the cylinder pressure, the target cylinder pressure being the cylinder pressure and a target.

\* \* \* \* \*